United States Patent
Takeuchi

(10) Patent No.: US 9,459,763 B2
(45) Date of Patent: *Oct. 4, 2016

(54) PORTABLE TELEPHONE

(75) Inventor: Ryosuke Takeuchi, Saitama (JP)

(73) Assignee: DRNC Holdings, Inc., Wilmington, DE (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/606,587

(22) Filed: Nov. 30, 2006

(65) Prior Publication Data

US 2007/0070055 A1 Mar. 29, 2007

Related U.S. Application Data

(63) Continuation of application No. 09/927,050, filed on Aug. 9, 2001, now Pat. No. 7,405,722.

(30) Foreign Application Priority Data

Aug. 11, 2000 (JP) .................................. 2000-245401

(51) Int. Cl.
*G06F 3/0482* (2013.01)
*G06F 3/0362* (2013.01)
(Continued)

(52) U.S. Cl.
CPC ........... *G06F 3/0482* (2013.01); *G06F 3/0362* (2013.01); *H04M 1/72522* (2013.01);
(Continued)

(58) Field of Classification Search
CPC .. G06F 3/0362; G06F 3/0482; H04M 1/233; H04M 1/6041; H04M 1/6058; H04M 1/72522; H04M 1/72536; H04M 1/72547; H04M 1/72552; H04M 1/72558; H04M 1/72561; H04M 2250/14; H04M 2250/16; C12Q 1/6886; C12Q 2600/156; C12Q 2600/172; G01N 33/57415
USPC ........ 345/156–184, 204, 2.1, 2.3; 455/556.1, 455/566, 556, 412.1; 715/713; 435/6.14, 435/6.16
See application file for complete search history.

(56) References Cited

U.S. PATENT DOCUMENTS 4,803,487 A 2/1989 Willard et al.
5,095,308 A 3/1992 Hewitt
(Continued)

FOREIGN PATENT DOCUMENTS

EP 0193933 A2 9/1986
EP 0 831 414 3/1998
(Continued)

OTHER PUBLICATIONS

"Handbook for the Pam III Organizer" 'Online 1998, 3COM Corporation XP002261999 Retrieved from the Internet: URL:http://www.plamone.com/us/support/handbooks/palm3.pdf' rertrieved on Nov. 18, 2003.
(Continued)

*Primary Examiner* — Dmitriy Bolotin
(74) *Attorney, Agent, or Firm* — Condo Roccia Koptiw LLP

(57) ABSTRACT

In a portable telephone according to the present invention, a display displays a block indicative of an operator, predetermined information and a pointer; the operator can be operated in directions opposite to each other; and the controller controls the display so as to shift the pointer to a desirable position within a predetermined information on a screen of the display in accordance with an operation of the operator and also display a mark indicative of a direction to which the pointer can be shifted and in which the predetermined information exists, adjacently to the block along a shift direction through the operator.

11 Claims, 22 Drawing Sheets

(51) Int. Cl.
*H04M 1/725* (2006.01)
*H04M 1/23* (2006.01)
*H04M 1/60* (2006.01)

(52) U.S. Cl.
CPC ......... *H04M1/72552* (2013.01); *H04M 1/233* (2013.01); *H04M 1/6041* (2013.01); *H04M 1/6058* (2013.01); *H04M 1/72536* (2013.01); *H04M 1/72547* (2013.01); *H04M 1/72558* (2013.01); *H04M 1/72561* (2013.01); *H04M 2250/14* (2013.01); *H04M 2250/16* (2013.01)

(56) References Cited

U.S. PATENT DOCUMENTS

| | | | |
|---|---|---|---|
| 5,329,578 A | 7/1994 | Brennan et al. | |
| 5,493,703 A | 2/1996 | Yamashita | |
| 5,537,608 A | 7/1996 | Beatty et al. | |
| 5,561,712 A | 10/1996 | Nishihara | |
| 5,659,594 A | 8/1997 | Toda | |
| 5,675,524 A | 10/1997 | Bernard | |
| 5,749,052 A | 5/1998 | Hidem et al. | |
| 5,758,295 A * | 5/1998 | Ahlberg et al. | 455/566 |
| 5,774,540 A | 6/1998 | Davidson et al. | |
| 5,802,460 A | 9/1998 | Parvulescu et al. | |
| 5,809,432 A | 9/1998 | Yamashita | |
| 5,815,407 A | 9/1998 | Huffman et al. | |
| 5,825,353 A | 10/1998 | Will | |
| 5,867,796 A | 2/1999 | Inutsuka | |
| 5,878,353 A | 3/1999 | Ul Azam et al. | |
| 5,924,044 A | 7/1999 | Vannatta et al. | |
| 5,960,367 A | 9/1999 | Kita | |
| 5,973,612 A | 10/1999 | Deo et al. | |
| 6,032,050 A | 2/2000 | Hasegawa | |
| 6,058,164 A * | 5/2000 | Ibuka et al. | 379/67.1 |
| 6,097,964 A | 8/2000 | Nuovo et al. | |
| 6,125,283 A | 9/2000 | Kolev et al. | |
| 6,128,012 A | 10/2000 | Seidensticker et al. | |
| 6,128,625 A | 10/2000 | Yankowski | |
| 6,215,993 B1 * | 4/2001 | Ulveland | 455/415 |
| 6,216,017 B1 | 4/2001 | Lee et al. | |
| 6,216,266 B1 | 4/2001 | Eastman et al. | |
| 6,259,436 B1 * | 7/2001 | Moon et al. | 345/173 |
| 6,272,359 B1 | 8/2001 | Kivela et al. | |
| 6,332,024 B1 | 12/2001 | Inoue et al. | |
| 6,345,180 B1 | 2/2002 | Reichelt | |
| 6,388,958 B1 | 5/2002 | Yankowski | |
| 6,408,177 B1 * | 6/2002 | Parikh et al. | 455/414.4 |
| 6,424,820 B1 | 7/2002 | Burdick et al. | |
| 6,425,018 B1 | 7/2002 | Kaganas et al. | |
| 6,453,182 B1 * | 9/2002 | Sprigg et al. | 455/574 |
| 6,459,911 B1 | 10/2002 | Hijii | |
| 6,470,196 B1 * | 10/2002 | Yamashita | 455/567 |
| 6,510,207 B1 | 1/2003 | Cannon et al. | |
| 6,571,086 B1 | 5/2003 | Uusimaki | |
| 6,600,936 B1 | 7/2003 | Karkkainen et al. | |
| 6,606,506 B1 * | 8/2003 | Jones | 455/556.1 |
| 6,625,478 B1 | 9/2003 | Nonogaki | |
| 6,662,022 B1 * | 12/2003 | Kanamori et al. | 455/556.1 |
| 6,681,120 B1 * | 1/2004 | Kim | 455/556.1 |
| 6,687,497 B1 | 2/2004 | Parvulescu et al. | |
| 6,757,372 B1 * | 6/2004 | Dunlap et al. | 379/142.17 |
| 6,760,759 B1 | 7/2004 | Chan | |
| 6,950,126 B1 | 9/2005 | Homma et al. | |
| 6,985,754 B1 | 1/2006 | Pedersen et al. | |
| 7,016,707 B2 | 3/2006 | Fujisawa et al. | |
| 7,123,936 B1 * | 10/2006 | Rydbeck et al. | 455/557 |
| 7,348,961 B1 | 3/2008 | Shneidman | |
| 7,405,722 B2 * | 7/2008 | Takeuchi | 345/156 |
| 7,580,006 B2 | 8/2009 | Takeuchi | |
| 7,634,299 B2 | 12/2009 | Mise et al. | |
| 2003/0013432 A1 | 1/2003 | Fukaya | |

FOREIGN PATENT DOCUMENTS

| | | |
|---|---|---|
| EP | 1 004 957 | 5/2000 |
| EP | 1 009 142 | 6/2000 |
| GB | 2 337 897 | 12/1999 |
| JP | 61-179646 | 8/1986 |
| JP | 62-140545 A | 6/1987 |
| JP | 2-119489 | 5/1990 |
| JP | 03-179938 A | 8/1991 |
| JP | H 4-243358 | 8/1992 |
| JP | 5-6958 | 1/1993 |
| JP | 5-75769 | 3/1993 |
| JP | 5-204335 | 8/1993 |
| JP | 06-104812 A | 4/1994 |
| JP | 6-205274 | 7/1994 |
| JP | 8-18347 | 1/1996 |
| JP | 9 223291 | 8/1997 |
| JP | 9 321839 | 12/1997 |
| JP | 10-200938 A | 7/1998 |
| JP | 10-304430 A | 11/1998 |
| JP | 11-98244 | 4/1999 |
| JP | 11 168540 | 6/1999 |
| JP | 11 284700 | 10/1999 |
| JP | 11 514482 | 12/1999 |
| JP | 2000-40970 | 2/2000 |
| JP | 2000-069561 A | 3/2000 |
| JP | 2000-78301 A | 3/2000 |
| JP | 2000 115324 | 4/2000 |
| JP | 2000-151455 | 5/2000 |
| JP | 2000-156812 | 6/2000 |
| JP | 2000-209363 | 7/2000 |
| JP | 2000 231371 | 8/2000 |
| JP | 2000 259304 | 9/2000 |
| JP | 2001-309024 | 11/2001 |
| JP | 2001 333173 | 11/2001 |
| JP | 2002 55762 | 2/2002 |
| JP | 2002 57751 | 2/2002 |
| JP | 2002 57756 | 2/2002 |
| JP | 2002 57757 | 2/2002 |
| JP | 2002 57760 | 2/2002 |
| JP | 2002 57761 | 2/2002 |
| JP | 2002 58072 | 2/2002 |
| KR | 10-1999-0061622 A | 7/1999 |
| KR | 10-2000-0060078 A | 10/2000 |
| KR | 10-2000-0062539 A | 10/2000 |
| KR | 10-2001-0098792 A | 11/2001 |
| WO | WO 99 09711 | 2/1999 |
| WO | WO 99 45459 | 9/1999 |
| WO | WO 99/59372 A1 | 11/1999 |
| WO | WO 00/02350 A1 | 1/2000 |

OTHER PUBLICATIONS

Kyocera, Phantom User Guide, 2003, Kyocera Wireless Corp., p. 8.
NTT DoCoMo, "Digital Mova D502i Hyper Users Guide", Portable Phone Function Version, NTT DoCoMo Group, Mitsubishi Electric Corporation, Jan. 2000, 6 pages.

* cited by examiner

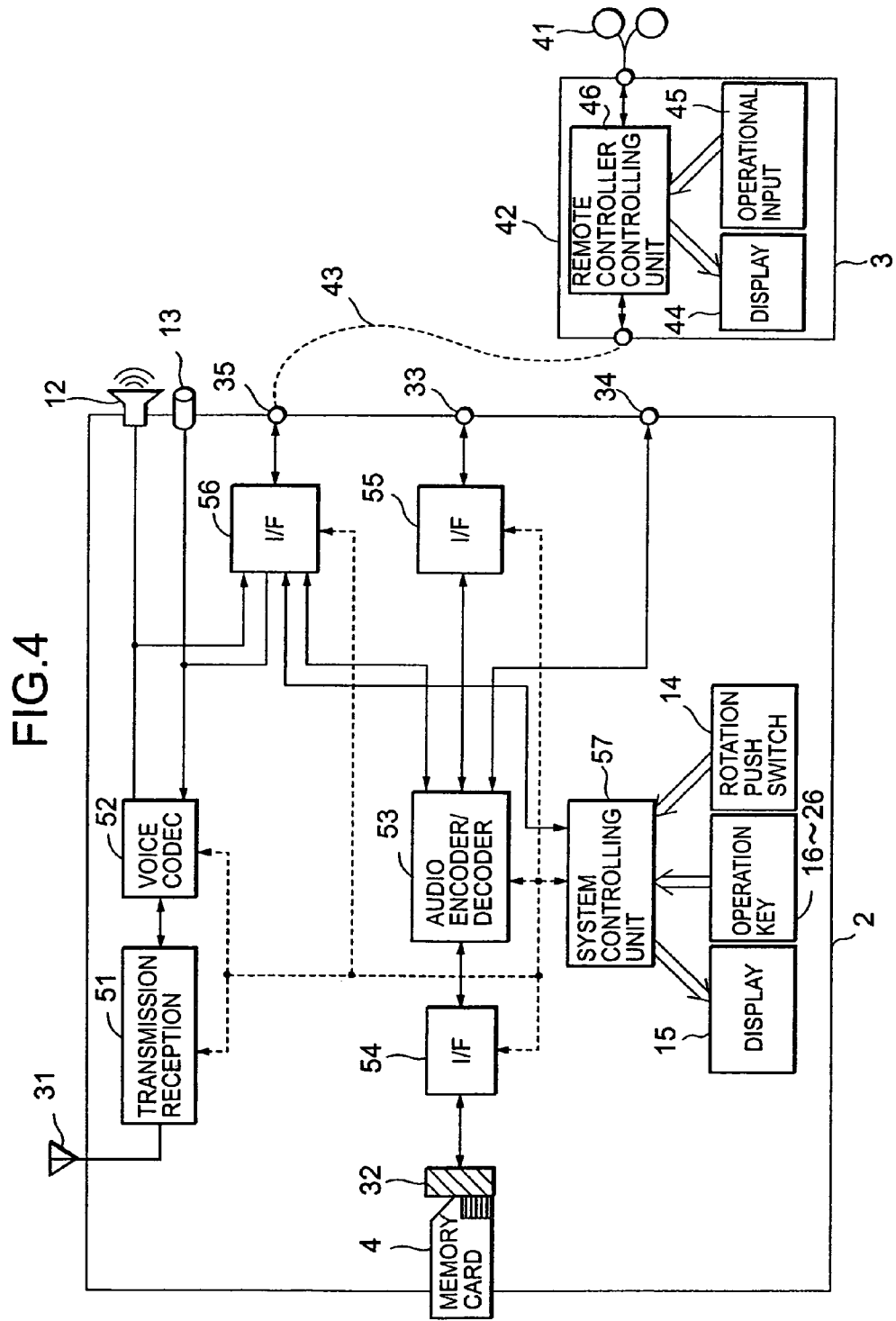

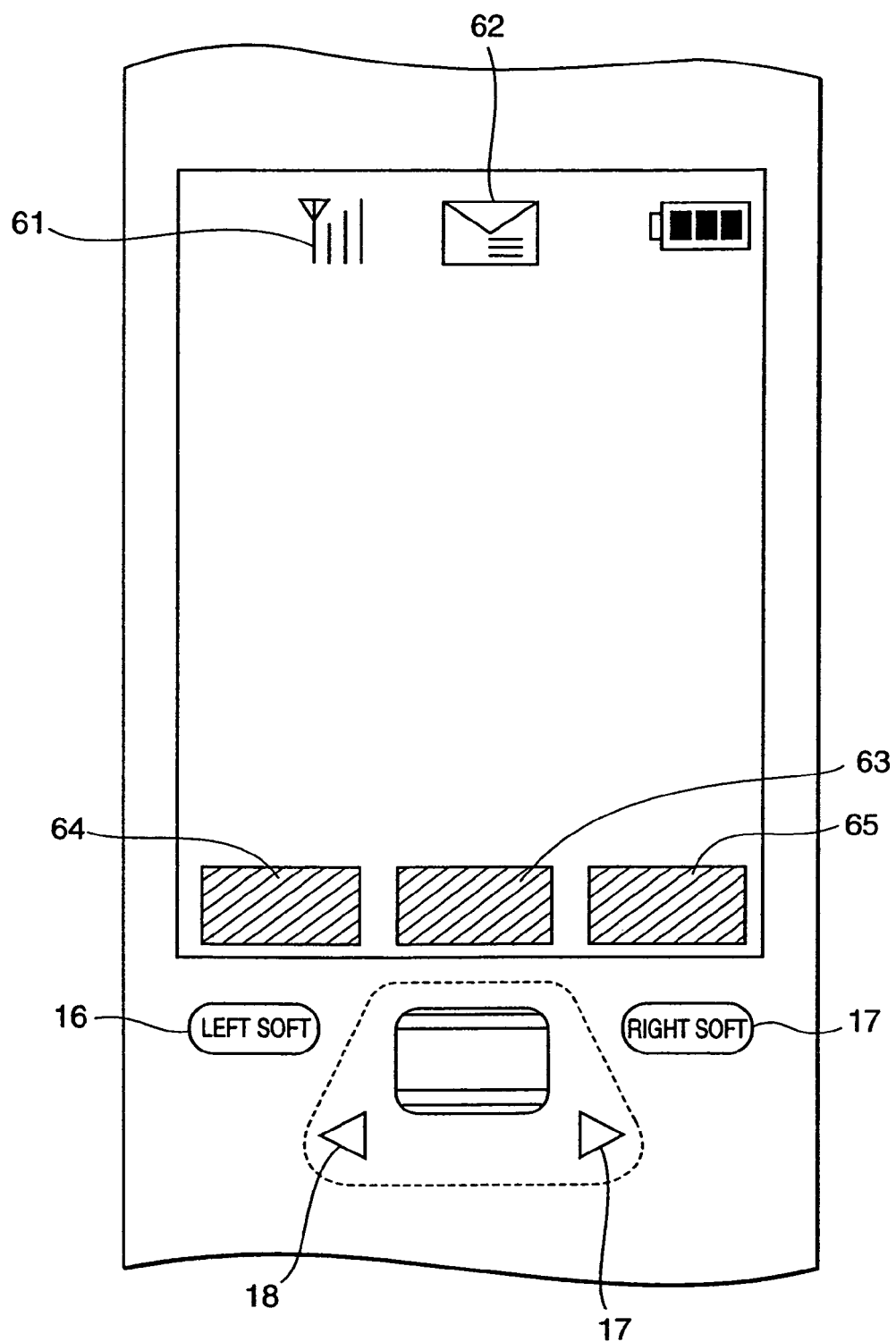

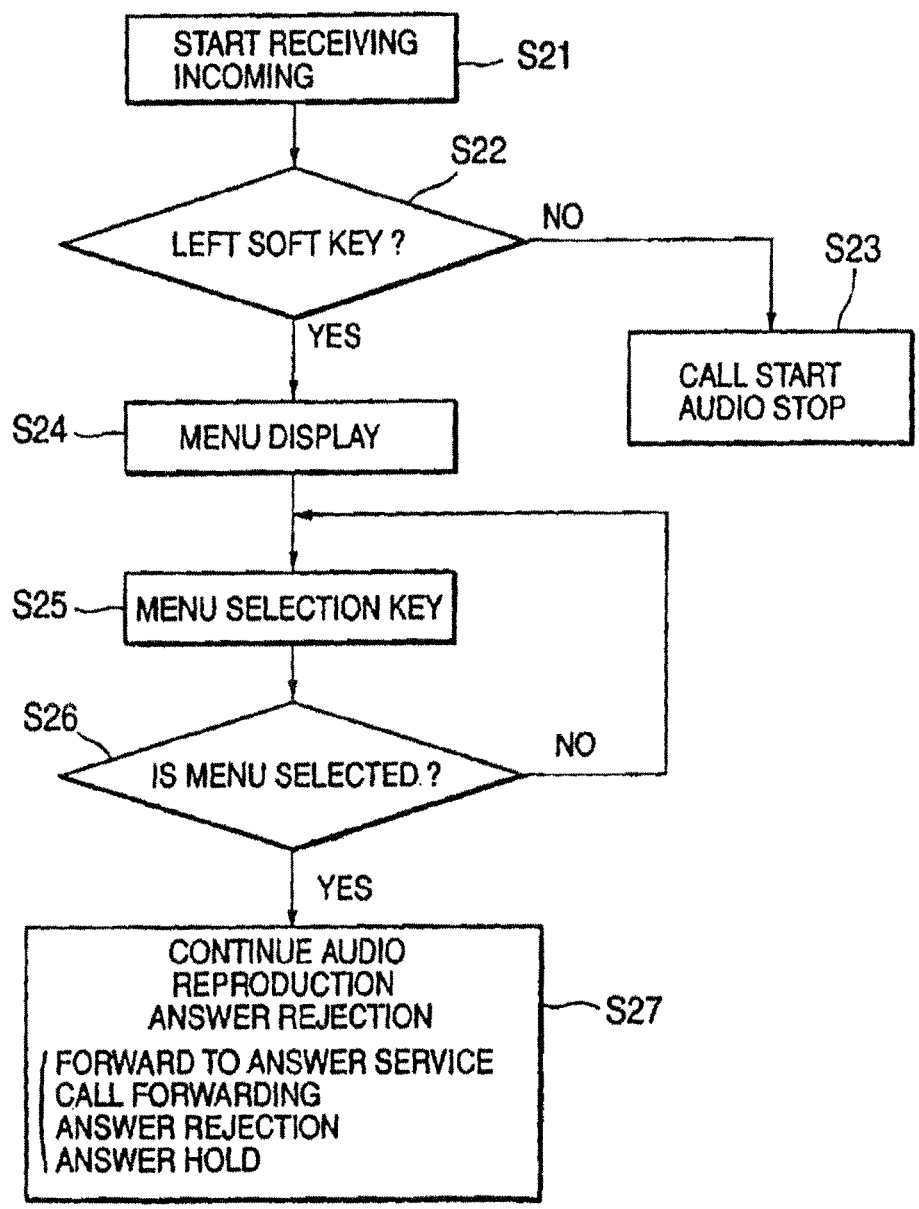

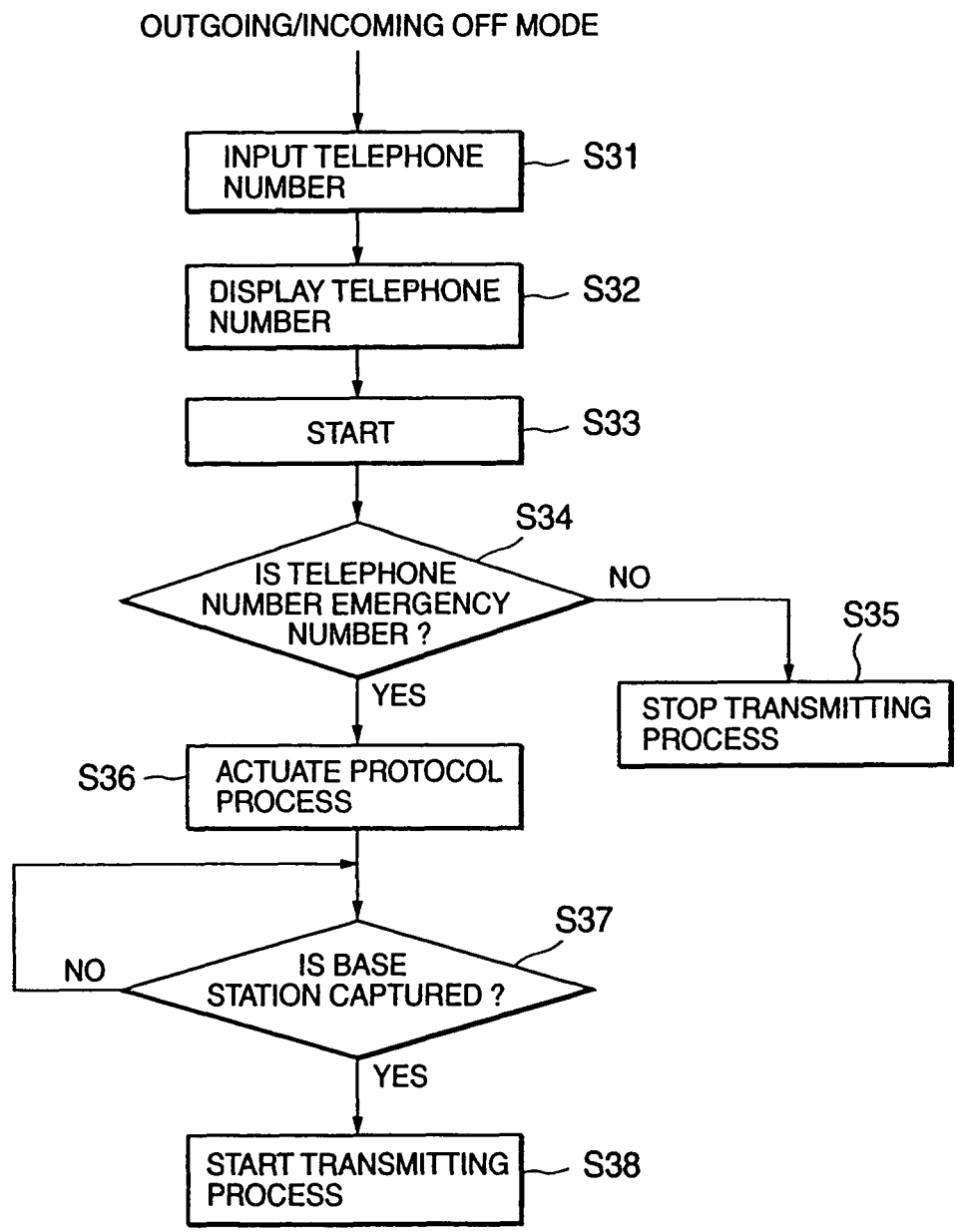

PORTABLE TELEPHONE

CROSS REFERENCES TO RELATED APPLICATIONS

This application is a Continuation of U.S. application Ser. No. 09/927,050, filed Aug. 9, 2001, which was granted as U.S. Pat. No. 7,405,722 on Jul. 29, 2008, which claims priority to Japanese application 2000-245401, filed in Japan on Aug. 11, 2000, the entirety of which is incorporated by reference.

BACKGROUND OF THE INVENTION

1. Field of the Invention

The present invention relates to a portable telephone.

2. Description of Related Art

In recent years, not only a telephone call function but also additional functions, such as an electronic mail function for sending and receiving an electronic mail by using an Internet protocol or another unique network protocol and an Internet function so as to read even WEB have been added to a portable telephone. Also, the inclusion of a memory card serving as a small memory medium in a portable telephone can attain a portable telephone in which an audio signal and a picture signal can be recorded and reproduced as the additional functions. In this way, not only the original telephone function but also the various additional functions are added to the portable telephone. It is tried to develop the portable telephone having multiple functions.

A relatively large display is typically mounted in the portable telephone having the thus attained multiple functions. Also, a direction key and a page scroll key are also mounted for retrieving or selecting information displayed on this display.

By the way, even if it is tried to make the display larger, there is also the limit of the size of the portable telephone itself. For example, if an electronic mail is displayed, if WEB is displayed, or if information stored on a memory card is displayed, the display becomes relatively narrow with respect to the information to be displayed.

In such a case, it is necessary to find out a target information or select the information by operating a direction key for shifting a focus position placed as an operation key of the portable telephone in an upper, lower, leftward or rightward direction, or a page scroll key for scrolling upwardly or downwardly displayed information correspondingly to one page.

However, only from the information displayed on the display, a user cannot find out whether or not the information is located outside a display range or whether or not the focus can be shifted from a current position. Thus, as a first step, the user operates the direction key or operates the page scroll key, and thereby checks the existence of the information existing outside the display range. However, such an operation is very troublesome and difficult.

SUMMARY OF THE INVENTION

Accordingly, there has been a need to provide a portable telephone in which the operational performances of the direction keys and the like and the convenience for the user are improved.

In order to solve the above-mentioned problems, a portable telephone according to the present invention is characterized in that it is provided with: a first operating portion that can be operated in directions opposite to each other; a display for displaying a block indicative of the first operating portion, predetermined information and a pointer; and a controller for controlling the display so as to shift the pointer to a desirable position within the predetermined information on a screen of the display in accordance with an operation of the operating portion and also display a mark indicative of a direction to which the pointer can be shifted and in which the predetermined information exists, adjacently to the block along a shift direction through the first operating portion.

A portable telephone according to the present invention further comprises a second operating portion for shifting the pointer in a direction vertical to a shift direction of the pointer through the first operating portion, wherein the controller controls the display so as to display a mark indicative of a direction to which the pointer can be shifted by the second operating portion and in which the predetermined information exists, adjacently to the block along a shift direction through the second operating portion.

The first operating portion is a rotatable dial, and the second operating portion is two keys, which are arranged closely to each other, on both sides of the rotatable dial.

BRIEF DESCRIPTION OF THE DRAWINGS

FIG. 4 is an inner configuration view of the portable telephone;

FIG. 5 is a view explaining an electric field strength display, an incoming mail indicating display and a soft key function display to be displayed on a display of the portable telephone;

FIG. 6 includes views explaining a procedure for displaying a title list of a song recorded on a memory card; in which

FIG. 16 is a flowchart showing a processing procedure when there is an incoming call during music reproduction;

FIG. 17 is a flowchart showing a processing procedure when a telephone number is inputted in a case of a setting at an outgoing/incoming call off mode;

DETAILED DESCRIPTION OF THE PREFERRED EMBODIMENTS

A portable telephone having a function of recording and reproducing an audio data (hereafter, referred to as a portable telephone) is described as an embodiment to which the present invention is applied. The following portable telephone has a function of an electronic mail and searching for WEB through the Internet and a function of recording and reproducing an audio data since a memory card is mounted, as well as a normal telephone call function.

Figure 1:
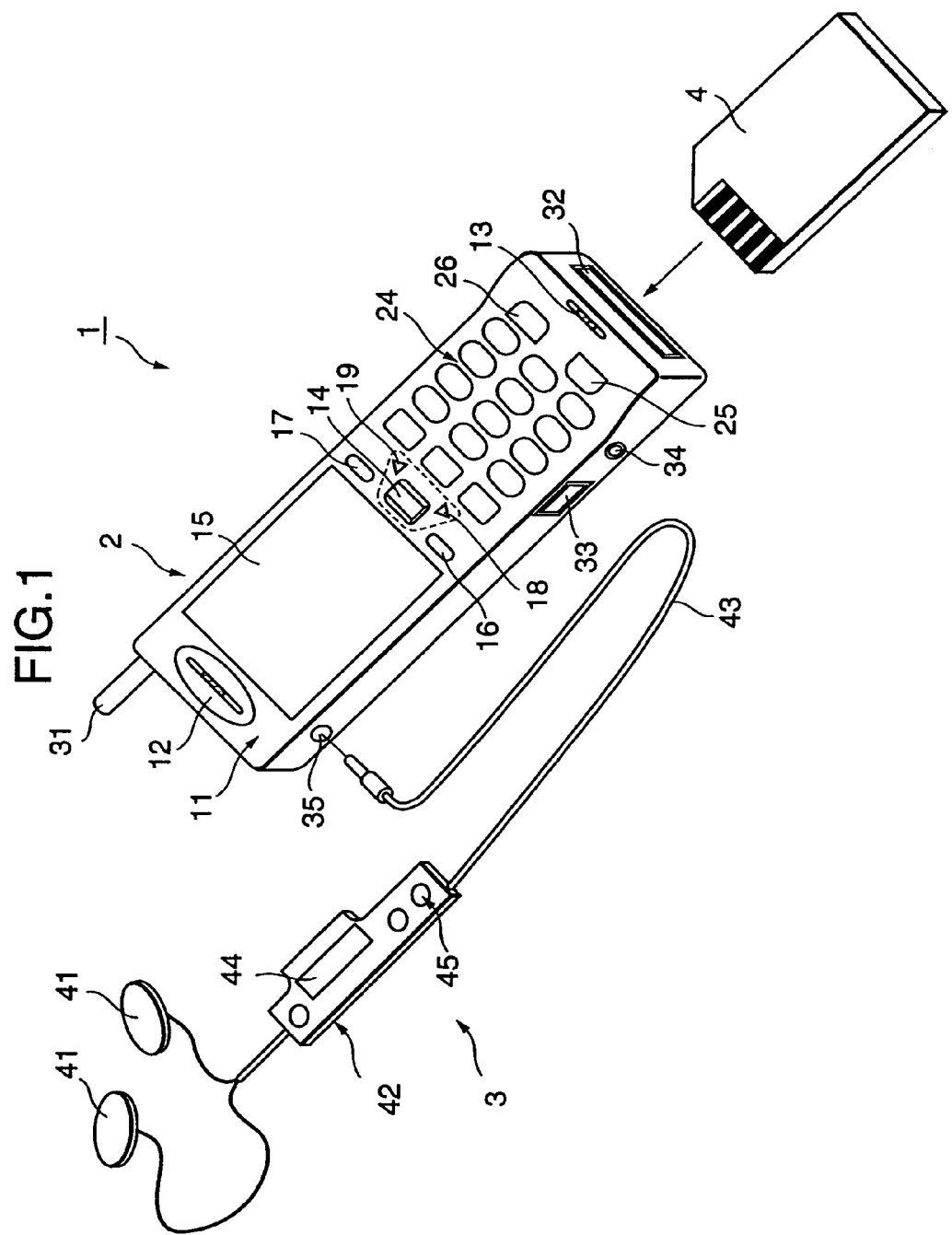
FIG. 1 is an appearance perspective view of a portable telephone in an embodiment of the present invention.
Figure 2:
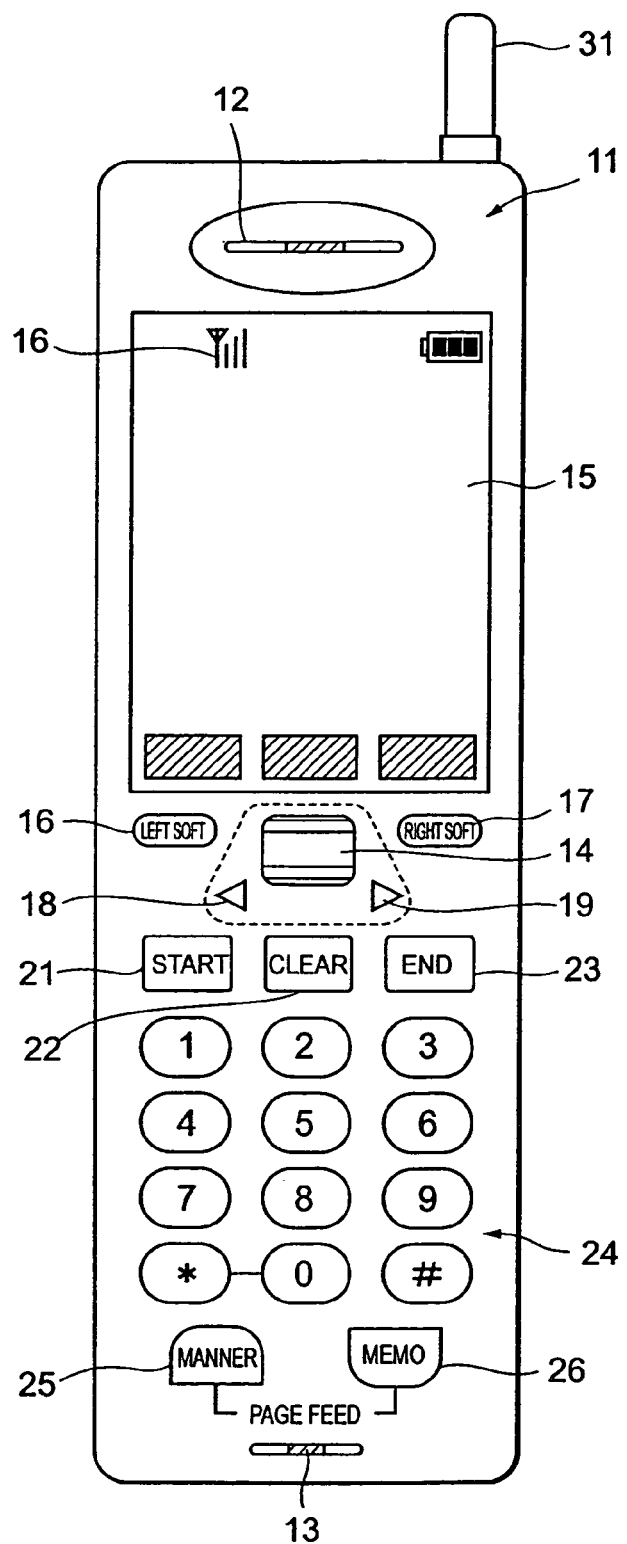
FIG. 2 is a plan view of the portable telephone.
Figure 3:
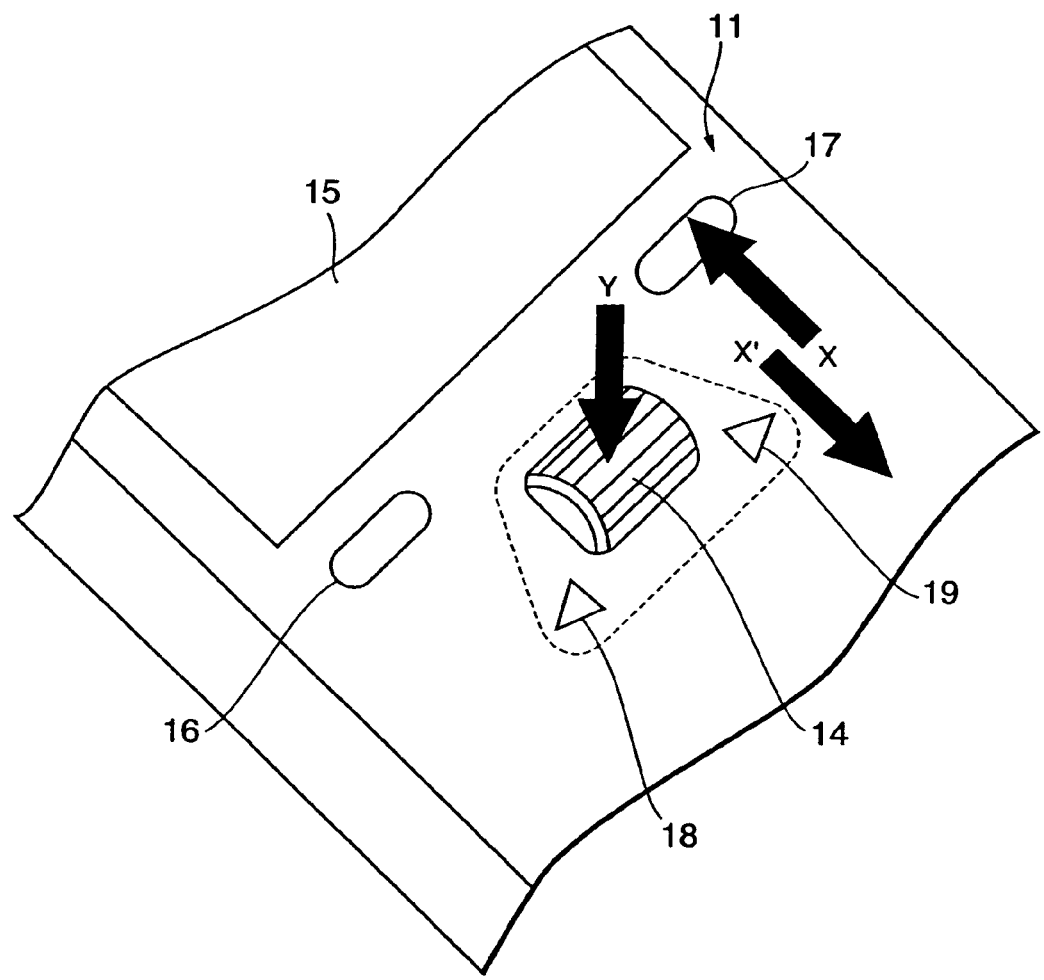
FIG. 3 is an enlarged view of a main portion of the portable telephone.

FIG. 1 shows an exterior perspective view of a portable telephone 1 in the embodiment of the present invention. FIG. 2 shows a plan view of this portable telephone 1. And, FIG. 3 shows an enlarged view of the main portion of this portable telephone 1.

The portable telephone 1 is provided with a main body 2 which is substantially rectangular parallelepiped having main functions such as a telephone function and the like, and a remote controller unit 3 that has a remote operation function and an earphone microphone function of the main body 2 and can be disposed in the main body 2.

At first, the main body 2 is described.

A voice output speaker 12 is mounted at one end in a longitudinal direction on an operation surface 11 of the main body 2, and a voice input microphone 13 is mounted at the other end in the longitudinal direction. By the way, from the viewpoint of the positional relation between the speaker 12 and the microphone 13, the direction in which the speaker 12 is mounted is referred to as an upper portion, and the direction in which the microphone 13 is mounted is referred to as a lower direction.

A rotation push switch 14 is mounted at a substantial center in a short side direction of the operation surface 11, between the speaker 12 and the microphone 13 on the operation surface 11 of the main body 2. This rotation push switch 14 is the switch that can be actuated by a rotating operation and also actuated by a pushing operation. This rotation push switch 14 is designed such that its rotating operation direction is the upper and lower directions of the operation surface 11 (X and X' directions shown in FIG. 3) and its pushing direction is the direction pushed vertically to the operation surface 11 (Y-direction shown in FIG. 3).

A display 15 constituted by, for example, a liquid crystal display panel is mounted between the main body 2 and the rotation push switch 14 on the operation surface 11 of the main body 2.

A left soft key 16 and a right soft key 17 are mounted between the display 15 and the rotation push switch 14 on the operation surface 11 of the main body 2. The left soft key 16 is mounted on a left side in a short side direction towards the operation surface 11, and the right soft key 17 is mounted on a right side in the short side direction towards the operation surface 11. Also, on the operation surface 11 of the main body 2, a leftward direction key 18 is mounted on a left adjacent side of the rotation push switch 14, and a rightward direction key 19 is mounted on a right adjacent side thereof.

A start key 21 to carry out a call start and the like, a clear key 22, an end key 23 to carry out an end of a telephone outgoing and the like and twelve dial keys (0 to 9 and * and #) 24 are mounted between the rotation push switch 14 and the microphone 13 on the operation surface 11 of the main body 2.

A manner key 25 to set a so-called manner mode for removing an incoming tone via a sound, and a memo key 26 to be used when a telephone number and the like are stored during a call are mounted between the dial keys (0 to 9, and * and #) 24 and the microphone 13 on the operation surface 11 of the main body 2.

An antenna 31 for sending and receiving an electric wave to and from a base station for the portable telephone is disposed on a side plane of an upper end of the main body 2.

An insertion slot 32 into which a memory card 4 is inserted is mounted on a side plane of a lower end of the main body 2.

A data input/output terminal 33 to send and receive data to and from a computer and the like, a line input terminal 34 to receive an audio data from an external audio apparatus, such as MD, CD, DVD or the like, and a remote controller unit terminal 35 to establish a connection to the remote controller unit 3 are mounted on a side of a left side plane of the main body 2.

The remote controller unit 3 will be described below.

The remote controller unit 3 is composed of an earphone microphone 41, a remote controller 42 and a connection cable 43.

The earphone microphone 41 is the unit into which an earphone and a microphone are integrated. The usage of this earphone microphone 41 enables a call to be carried out, for example, while the main body 2 is kept in a bag. The earphone microphone 41 is also used when audio data recorded on the memory card 4 is heard. This earphone microphone 41 is configured so as to be detachable from the remote controller 42.

A display unit 44 and an operation input unit 45 are mounted in the remote controller 42. The remote controller 42 is intended to remotely operate the main body 2.

Such a remote controller unit 3 can be operated when the remote controller 42 is connected through the connection cable 43 to the main body 2. For example, the remote controller unit 3 can carry out the remote operations such as an incoming of a telephone, a reproduction, a stop and a fast forward of an audio signal, and the like. By the way, the main body 2 and the remote controller unit 3 may send and receive a data through a wireless communication such as infrared rays and the like without any connection via a cable.

The inner configuration of this portable telephone 1 will be described below.

FIG. 4 is a functional block diagram of the portable telephone 1.

The main body 2 of the portable telephone 1 is provided with the speaker 12, the microphone 13, the rotation operation switch 14, the display 15, the various operation keys 16 to 26, the antenna 31, the insertion slot 32, the data input output terminal 33, the line input terminal 34 and the remote controller unit terminal 35. Moreover, this main body 2 is composed of a transmission/reception unit 51, a voice codec 52, an audio encoder/decoder 53, a memory card interface (memory card I/F) 54, a digital data interface (digital I/F) 55, a remote controller interface (remote controller I/F) 56 and a system controlling unit 57.

The remote controller unit 3 is composed of the earphone microphone 41, the remote controller 42 and the connection cable 43. The remote controller 42 of the remote controller unit 3 has the display 44, the operation input unit 45 and a remote controller controlling unit 46.

The transmission/reception unit 51 of the main body 2 carries out a process for transmitting an electric wave to the base station, and a process for receiving an electric wave from the base station. The transmission/reception unit 51 demodulates the received electric wave through the antenna 31, and sends the demodulated data to the voice codec 52. Also, the transmission/reception unit 51 modulates the data sent from the voice codec 52, and sends it through the antenna 31.

The voice codec 52 encodes and decodes the voice data. The voice codec 52 performs a voice decoding process on the demodulated data sent from the transmission/reception unit 51. The voice signal on which the voice decoding process is performed is outputted from the speaker 12, or sent through the remote controller I/F 56 to the remote controller unit 3 and outputted from the earphone microphone 41. Also, the voice codec 52 receives the voice signal from the microphone 13 or the earphone microphone 41, and encodes this voice signal and then sends to the transmission/reception unit 51.

The audio encoder/decoder 53 performs an audio encoding/decoding process on audio data to be recorded on the memory card 4. The audio data recorded on the memory card 4 inserted into the insertion slot 32 is sent through the memory card I/F 54 to the audio encoder/decoder 53. The audio encoder/decoder 53 performs the decoding process, such as an encryption decoding process, a voice expanding process or the like, on the audio data. The audio data on which the decoding process is performed is sent through the remote controller I/F 56 to the remote controller unit 3, and outputted from the earphone microphone 41. Also, the audio data inputted from an external portion is inputted through the data input output terminal 33 or the line input terminal 34 to the audio encoder/decoder 53. The audio encoder/decoder 53 performs the encoding process, such as a voice compressing process, an encryption decoding process or the like, on the inputted audio data. The audio data on which the encoding process is performed is recorded through the memory card I/F 54 on the memory card 4 inserted into the insertion slot 32.

The system controlling unit 57 carries out the controls of each of the above-mentioned units.

On the other hand, the remote controller controlling unit 46 in the remote controller 42 of the remote controller unit 3 transmits and receives the data to and from the main body 2, transmits and receives the signal to and from the earphone microphone 41, controls the display on the display unit 44, and controls the operational input from the operation input unit 45.

The main configuration and the main operation of the portable telephone 1 having the above-mentioned configuration will be described below.

This portable telephone 1 is the telephone of a wirelessly communicating system, and it is carried by a user. When this portable telephone 1 is located at a position at which the electric wave transmitted from the base station can be received, it becomes at a communicable state. At this communicable state, after any telephone number is pushed by using the dial keys 24, the start key 21 is pushed to start a call and then call out a partner. Also, at this time of the communicable state, an incoming call from the partner can be received. If there is the incoming call from the partner, any key is pushed to thereby start the call.

Here, in this portable telephone 1, in order to provide a current state of a call quality to the user, as shown in FIG. 5, an electric field strength indication 61 indicative of a level of an electric field strength of a received electric wave from the base station is displayed at a predetermined position on a left upper side of the display 15. The electric field strength is detected by, for example, the transmission/reception unit 51. The detected electric field strength information is periodically read by the system controlling unit 57. The system controlling unit 57 carries out the display control of the display 15 on the basis of the read electric field strength information, and provides the electric field strength information to the user. In this embodiment, this electric field strength indication 61 is represented at approximately four stage levels, such as an excellent level, a usual level, a bad level and an incommunicable level, for example.

Also, this portable telephone 1 has an electronic mail function of communicating with the base station and sending and receiving an electronic mail by using an Internet protocol.

For example, mail data is sent by displaying a predetermined mail input screen, and entering a sentence to be transmitted, and then selecting a mail transmission button when it is at the communicable state. Actually, the system controlling unit 57 encodes the inputted electronic mail, and the transmission/reception unit 51 once sends the encoded mail data to the base station, and the mail data is transferred from the base station to a mail server of a partner. Also, when an electronic mail is transferred from the partner to an address of the user, the base station sends the mail data to the portable telephone 1. The portable telephone 1, when receiving the mail data at the time of the communicable state, automatically carries out an incoming mail process, and stores the mail data in an inner memory. Then, the system controlling unit 57 of the portable telephone 1, when obtaining the mail data from the base station, displays a mail incoming indication 62 at a predetermined position on the display 15, as shown in FIG. 5.

Also, this portable telephone 1 has an Internet browsing function of communicating with the base station and viewing or a WEB site on the Internet.

For example, by displaying a browser screen of the Internet and then entering URL (Uniform Resource Locator) on this screen, communication with the base station is carried out, and a data provided through a predetermined URL is downloaded. When an input operation or a selection operation is carried out on the basis of the downloaded data, a predetermined data is further downloaded on the basis of the information.

In this portable telephone 1, the memory card 4 on which audio data is recorded can be attached and detached as necessary. It has a function of recording and reproducing the audio data, such as an operation for reproducing the audio data recorded on the memory card 4 and an operation for recording the audio data on this memory card 4.

When the audio data is reproduced, the memory card 4 is inserted into the insertion slot 32, and a reproduction button is selected. When the reproduction button is selected, the audio data recorded on the memory card 4 in the insertion slot 32 is decoded by the audio encoder/decoder 53, and outputted through the remote controller I/F 56 from the earphone microphone 41.

Also, this portable telephone 1 can record audio data received from an external computer or an external audio reproduction apparatus.

When audio data is recorded through the external computer, the data input output terminal 33 and the external computer are connected to each other by using, for example, an IEEE 1394 interface and the like. Then, an application software on the external computer is used to carry out an operation for transferring desirable audio data to the memory card 4 (a so-called check-in operation). Accordingly, new audio data can be written on the memory card 4. By the way, even an operation for editing the audio data recorded on the memory card 4 (for example, a deletion of data, a rearrangement of a reproducing order or the like) can be carried out by the external computer.

Also, when audio data is recorded through the external audio reproduction apparatus, the line input terminal 34 and the external audio reproduction apparatus are connected through a cable to each other. Desirable audio data is reproduced by the audio reproduction apparatus, and a recording start command is given to the portable telephone 1. Thus, a so-called dubbing is started. Then, new audio data can be written on the memory card 4. The transfer of the signal to the line input terminal 34 may be performed in a form of an analog signal or digital data. In a case of the analog signal being inputted, the audio encoder/decoder 53 carries out an A/D conversion, and converts the audio signal into the digital data. Then, the execution of the voice encoding process enables the audio data to be written on the memory card 4.

As mentioned above, this portable telephone 1 has the electronic mail function, the Internet browsing function and the function of recording and reproducing the audio data by using the memory card 4, in addition to the usual telephone call function. In this way, there is provided the portable telephone intended to have multiple function.

The respective operation keys and switches will be described below.

When a user operates each of the respective operation keys described below, its control command is sent to the system controlling unit 57. Then, the system controlling unit 57 carries out a control corresponding to a function of each key, as described below.

The rotation push switch 14 is the switch that can be operated by a rotating operation and can be operated by a pushing operation.

The rotating operation of the rotation push switch 14 functions as, for example, the direction key for shifting upwardly and downwardly the pointer, such as the focus, the cursor or the like, which is displayed on the display 15. The focus is, for example, the display to specify one piece of information (one icon, one menu title, one song title or the like) from information groups (for example, a plurality of icons, menu displays, list displays or the like) displayed on the display 15. Usually, the display of the specified information is highlighted or reversing displayed. This rotation push switch 14 is mounted at the center in the short side direction on the operation surface 11. Moreover, the direction of the rotating operation is the upper and lower directions (the longitudinal direction) of the operation surface 11. Thus, when the focus is shifted upwardly or downwardly, the shift of the focus on the display screen is parallel to the operation of an operating finger. Also, the operating finger is located oppositely to the display screen. Hence, the coincident feeling between the operational feeling and the screen operation is given to the user. Moreover, the buttons such as the upper and lower keys and the like make the operation easy.

The pushing operation of the rotation push switch 14 has the function as the so-called soft key. The soft key is a key in which an action when the button is pushed is changed in a programmable manner on the basis of the menu content and the information displayed on the display 15. This soft key is designed such that a content of a function selected when the button is pushed is displayed on the display 15 and the user can recognize the actual content of the action when this button is currently pushed. Concretely, the function selected when this rotation push switch 14 is pushed is displayed as a central soft key function indication 63, at a center on a lower side of the display screen of the display 15, as shown in FIG. 5.

The left soft key 16 functions as the above-mentioned soft key. A function selected when this left soft key 16 is pushed is displayed as a left soft key function indication 64, at a left hand position on a lower side of the display screen of the display 15, as shown in FIG. 5.

The right soft key 17 also functions as the above-mentioned soft key. A function selected when this right soft key 17 is pushed is displayed as a right soft key function indication 65, at a right hand position on a lower side of the display screen of the display 15, as shown in FIG. 5.

The leftward direction key 18 functions as a shift key to shift the focus and the cursor displayed on the display 15 to a leftward direction.

The rightward direction key 19 functions as a shift key to shift the focus and the cursor displayed on the display 15 to a rightward direction.

The start key 21 functions as a key to start a telephone call.

The clear key 22 functions as a key to switch a display state of the display screen to an initial display menu screen, or to clear input information.

The end key 23 functions as a key for terminating a call or a power supply unit key to carry out an end function of a telephone outgoing and turn on and off a power supply of the portable telephone 1.

The dial keys (0 to 9, and * and #) 24 function as the input keys for numerals 0 to 9 and symbols * and #. In addition, various characters are allocated thereto. Each of them functions as a character input key at a time of a character input of an electronic mail or the like. The kind of the allocated character is switched depending on a later-described character input mode setting screen. The kinds of the allocated characters include, for example, a kanji (Chinese character), a double-byte (full size) kana (Japanese character), a double-byte (full size) alphabet, a double-byte (full size) numeral, a double-byte (full size) symbol (character letter or pictorial letter), a standard sentence format, a single-byte (half size) kana, a single-byte (half size) alphabet, a single-byte (half size) numeral, a single-byte (half size) of symbol (character letter or pictorial letter) and the like.

The manner key 25 functions as a key to set the manner mode of removing an incoming tone via a voice or sound.

The memo key 26 functions as a key to store a telephone number and the like during a call service.

By the way, the manner key 25 and the memo key 26 also have a page feed function of scrolling information displayed on the display 15, correspondingly to one page. In a case of other than making a call, for example, writing an electronic mail or browsing a WEB, the manner key 25 functions as an upward page feed key, and the memo key 26 functions as a downward page feed key. Hereafter, the manner key 25 is referred to as an upward page feed key 25, and the memo key 26 is referred to as a downward page feed key 26.

(Rearrangement of Song Order)

An operation for rearranging an order of songs (music pieces) of audio data recorded on the memory card 4 will be described below.

In this portable telephone 1, it is possible to rearrange and edit the order of songs (music pieces) of the audio data recorded on the memory card 4. By the way, the music order described here implies the number order of the numbers given to respective information units, for example, such as the numbers of tracks or the numbers of files recorded in a management information of a record medium. Typically, it corresponds to a reproducing order in a case of a continuous reproduction. Thus, even if the song order is rearranged, the actual content (audio data) recorded on the memory card 4 is not rewritten. The file number and the track number managed as the management information, or a link relation between songs (music pieces) or the like are rewritten.

Figure 6A:
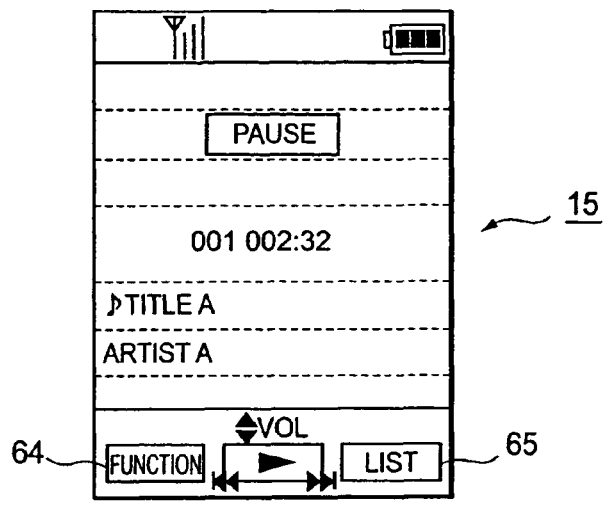
FIG. 6A is a view showing a state where reproduction of audio data is suspended.
Figure 6B:
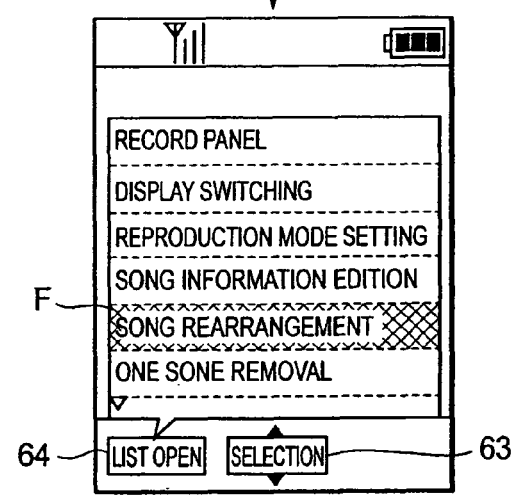
FIG. 6B is a view showing a state where an edit mode is selected.

At first, in the portable telephone 1, the audio data is reproduced. Once it is interrupted, a display screen is displayed as shown in FIG. 6A. If the left soft key 16 is pushed while this screen is displayed and "Function" is selected, an edition mode selection screen is displayed as shown in FIG. 6B.

Figure 6C:
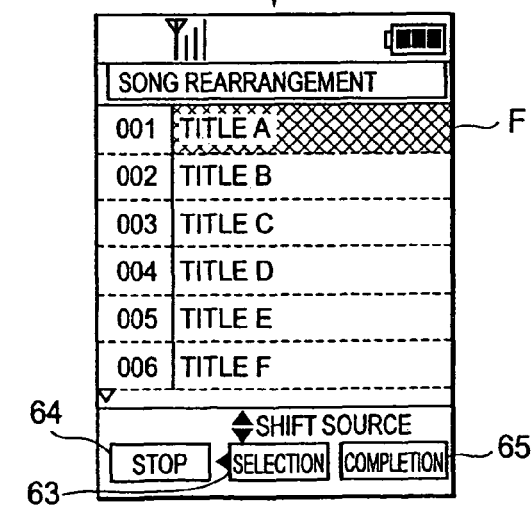
FIG. 6C is a view showing a title list display screen.

On this edition mode selection screen, the rotation push switch 14 is rotationally operated to shift a focus F upwardly and downwardly so that the focus F is located at a position of "Song Rearrangement". In succession, when the rotation push switch 14 is pushed and operated to select "Selection", a title list display screen is displayed as shown in FIG. 6C.

On this title list display screen, the titles and the title numbers to specify the songs (pieces of music) recorded on the memory card 4 are arranged in the upward and downward directions based on a song order currently being registered, and displayed in a form of list.

Figure 7A:
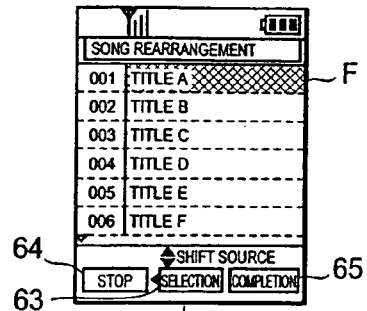
FIGS. 7A to 7E are views explaining a rearranging procedure for songs recorded on a memory card.
Figure 7B:
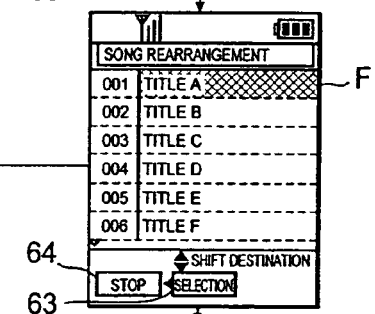

The focus F is firstly shifted from this state of the title list display screen to a position of a title of a song (music piece) desired to be shifted. At this time, the focus F is shifted by rotationally operating the rotation push switch 14 since the title list is arranged in the upward and downward directions. Here, as shown in FIG. 7A, it is assumed that the focus F is shifted to a position of "Title A". In succession, if the rotation push switch 14 is pushed and operated to select "Selection", "Title A" is selected as shown in FIG. 7B.

Figure 7C:
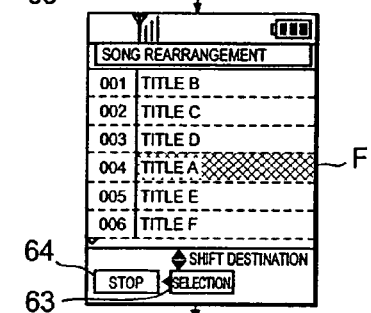
Figure 7D:
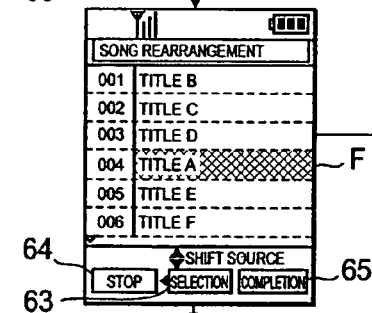
Figure 7E:
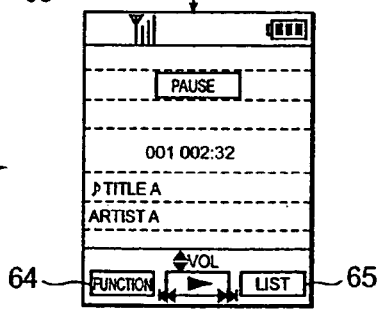

Here, in a case where the left soft key 16 is pushed when the screen shows the state at which this "Title A" is selected, and "Return" is selected, the operational flow returns back to a display screen in which the reproduction of the audio data is once stopped, as shown in FIG. 7E.

On the other hand, in a case where the rotation push switch 14 is rotationally operated when the screen shows the state at which this "Title A" is selected, the title character letters of "Title A" together with the focus F are shifted upwardly and downwardly on the title list. Then, the focus F and the title character letters of "Title A" are shifted to a position at which the rearrangement on the title list is desired. Here, as shown in FIG. 7C, it is assumed that they are shifted to a position between "Title D" and "Title E". In succession, the rotation push switch 14 is pushed and operated to select "Determination". Then, as shown in FIG. 7D, this leads to the state that the selected title is shifted to the desired position, which results in the completion of the rearrangement of the title list. Moreover, if another title is further desired to be shifted, the focus F is shifted from this screen to a position of a title of a song (music piece) desired to be shifted. At that position, the rotation push switch 14 is pushed and operated to select "Selection". Such operations enable the plurality of titles to be continuously shifted.

When the shifts of the titles are all completed, "Completion" is selected by pushing the right soft key 17 from a state of FIG. 7D. When this "Completion" is selected, the system controlling unit 57 rewrites the management information of the memory card 4 in accordance with the order of the title list currently being displayed, and also returns the display screen back to the screen in which the reproduction of the audio data is once stopped, as shown in FIG. 7E.

Figure 8:
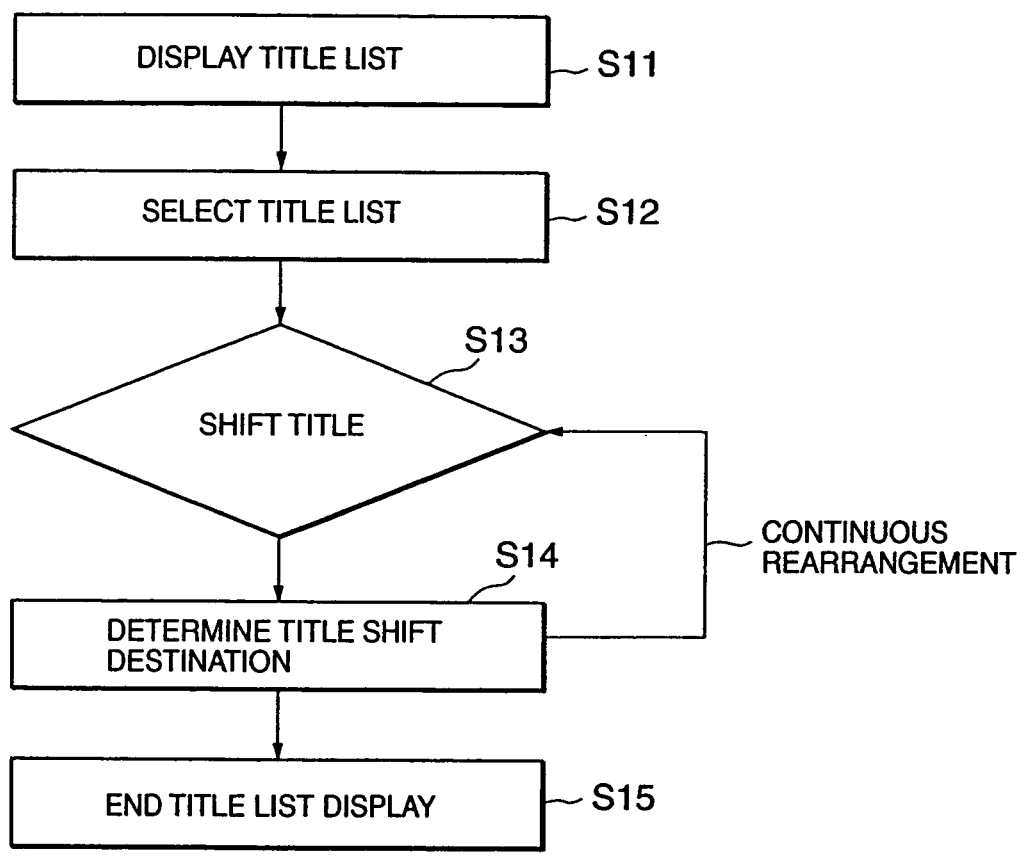
FIG. 8 is a flowchart explaining the rearranging procedure.

The above-mentioned processing procedure will be described below with reference to a flowchart in FIG. 8.

The title list in which the plurality of titles to specify the songs or music pieces recorded on the memory card 4 are arranged in accordance with the recording order is displayed (Step S11). In succession, by operating the rotation push switch 14 in the rotating direction, the focus is shifted to a title position of a song desired to be shifted. At the title position, the rotation push switch 14 is operated in the pushing direction, and its title is selected (Step S12). Next, the title selected by operating the rotation push switch 14 in the rotating direction is shifted to any position on the list (Step S13). Then, at the title position, the rotation push switch 14 is operated in the pushing direction to thereby determine the shift destination of the title (Step S14). After the determination of the shift destination of the title, it is possible to operate the rotation push switch 14 in the rotating direction to thereby select a title of a next song or music piece desired to be shifted. When the shifts of the titles are all completed, the display of the title list is ended, and the order of recording the songs recorded on the memory card 4 is rewritten in accordance with the title list order (Step S15).

As mentioned above, in the portable telephone 1, the editing work can be very easily carried out by rearranging the recording order of the audio data recorded on the memory card 4 in accordance with such an operational procedure.

By the way, the example of rearranging the audio data recorded on the memory card 4 has been described as mentioned above. However, in this procedure, the target for the rearrangement is not limited to the audio data. It may be applied to any information, if it is the information to define a recording order, for example, such as a picture data, a computer data, a telephone number list, an address list and the like. Also, the memory card 4 is exemplified as a recording medium. However, it may be any medium if it is a rewritable recording medium, such as the inner memory of the portable telephone 1, MD, and DVD-RAM.

(Switching of Character Input Mode)

An operation for switching a character input mode will be described below.

In the portable telephone 1, a plurality of character kinds are assigned to the dial keys 24. Any character kind of a character can be entered by switching the character input mode.

Figure 9A:
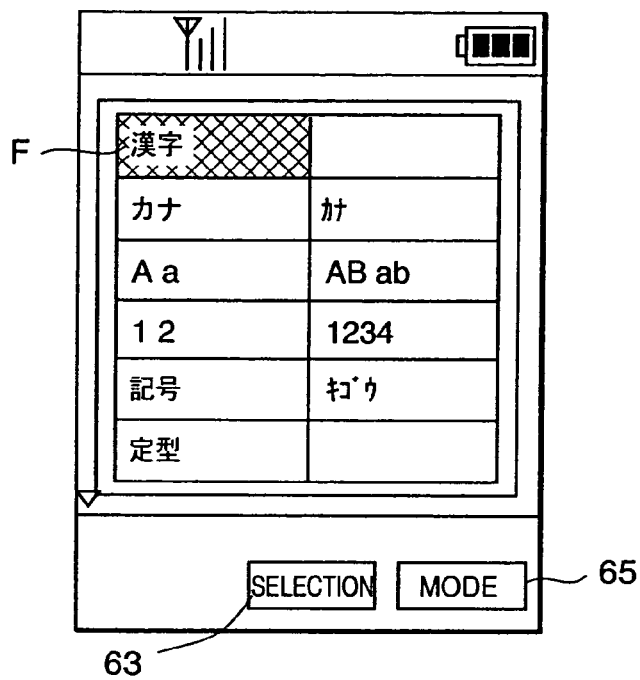
FIGS. 9A to 9B are views showing a character input mode selection screen.

In the portable telephone 1, when the right soft key 17 is pushed to select "Mode" when a character input screen is displayed at the time of writing an electronic mail or the like, a character input mode selection screen is displayed as shown in FIG. 9A.

On this character input mode selection screen, all the character kinds assigned to the dial keys 24 are displayed on a list of two columns. The character kinds assigned to the dial keys 24 include, for example, a kanji (Chinese character), a double-byte (full size) kana, a double-byte (full size) alphabet, a double-byte (full size) numeral, a double-byte (full size) symbol (character letter or pictorial letter), a standard sentence format, a single-byte (half size) kana, a single-byte (half size) alphabet, a single-byte (half size) numeral, and a single-byte (half size) symbol (character letter of pictorial letter). On this character input selection screen as shown in FIG. 9A and FIG. 9B, a kanji (Chinese character) (top column), a double-byte kana (second upper column), a double-byte alphabet (third upper column), a double-byte numeral (third lower column), a double-byte symbol (character letter or pictorial letter) (second lower column), a standard sentence format (bottom column) are displayed in the left column of the list, and a single-byte kana (second upper column), a single-byte alphabet (third upper column), a single-byte numeral (third lower column), and a single-byte symbol (character letter of pictorial letter) (second lower column) are displayed in the right column of the list.

Figure 9B:
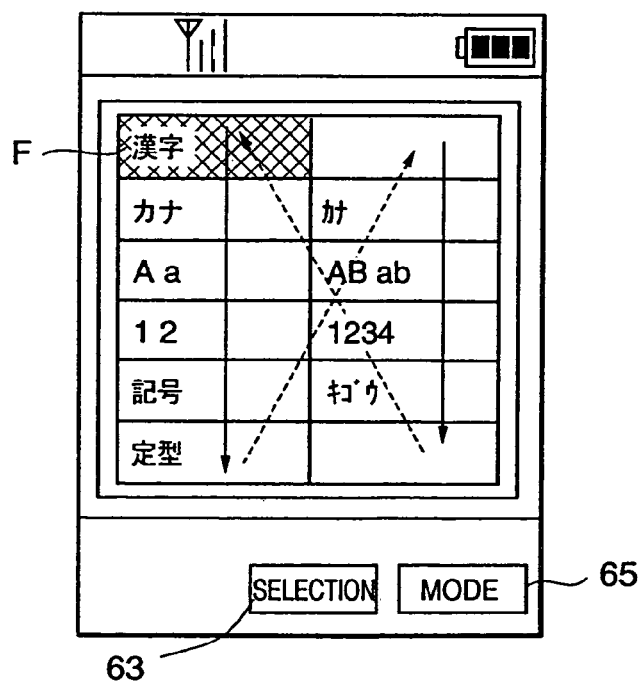

On this character input mode selection screen, the rotating operation of the rotation push switch 14 enables the focus F to be cyclically shifted in an order of a kanji→a double-byte kana→a double-byte alphabet→a double-byte numeral→a double-byte symbol (character) →a standard sentence format→a single-byte kana→a single-byte alphabet→a single-byte numeral→a single-byte symbol (character)→a kanji→a double-byte kana and so on, as shown in FIG. 9B. Also, pushing the leftward direction key 18 or the rightward direction key 19 causes the focus F to be shifted between the left and right columns.

When this character input mode selection screen is displayed, the rotation push switch 14 and the direction keys 18, 19 that are operated as mentioned above are used to shift the focus to the character kind desired to be used. Then, when the rotation push switch 14 is pushed and operated to select "Selection", the operational flow returns back to the screen to write the electronic mail or the like. Thus, it is possible to enter the character set of the selected character kind.

As mentioned above, in the portable telephone 1, when the character input mode is operationally set on a character write screen, the character input mode selection screen in which all the character kinds are displayed is displayed. The selection of a character kind based on this character input mode selection screen enables the character of any character kind assigned to the dial keys 24 to be entered.

For this reason, in the portable telephone 1, the character input mode can be easily selected without any troublesome work such as an operation for pushing the mode set buttons, one by one, and then switching the character input mode.

By the way, on the character input mode selection screen, it may be designed to display only the character kind that can be entered at that time or select only the character kind that can be entered at that time. For example, when an electronic mail address or URL is entered, it is possible to design the character input mode selection screen so that only a half size of alphabet and a half size of numeral can be selected.

(Guidance Display)

A guidance display of a shiftable direction of a focus or the like and a guidance display of a page feed key will be-described below.

In this portable telephone 1, a direction key guidance display is carried out for indicating whether or not the rotation push switch 14 can be rotationally operated and whether or not the leftward direction key 18 and the rightward direction key 19 can be operated. That is, the direction key guidance display indicates whether or not the pointer such as the focus, the cursor and the like can be effectively shifted upwardly and downwardly by rotationally operating the rotation push switch 14 and whether or not the pointer such as the focus, the cursor and the like can be effectively shifted in the leftward and rightward directions by operating the leftward direction key 18 and the rightward direction key 19.

Figure 10:
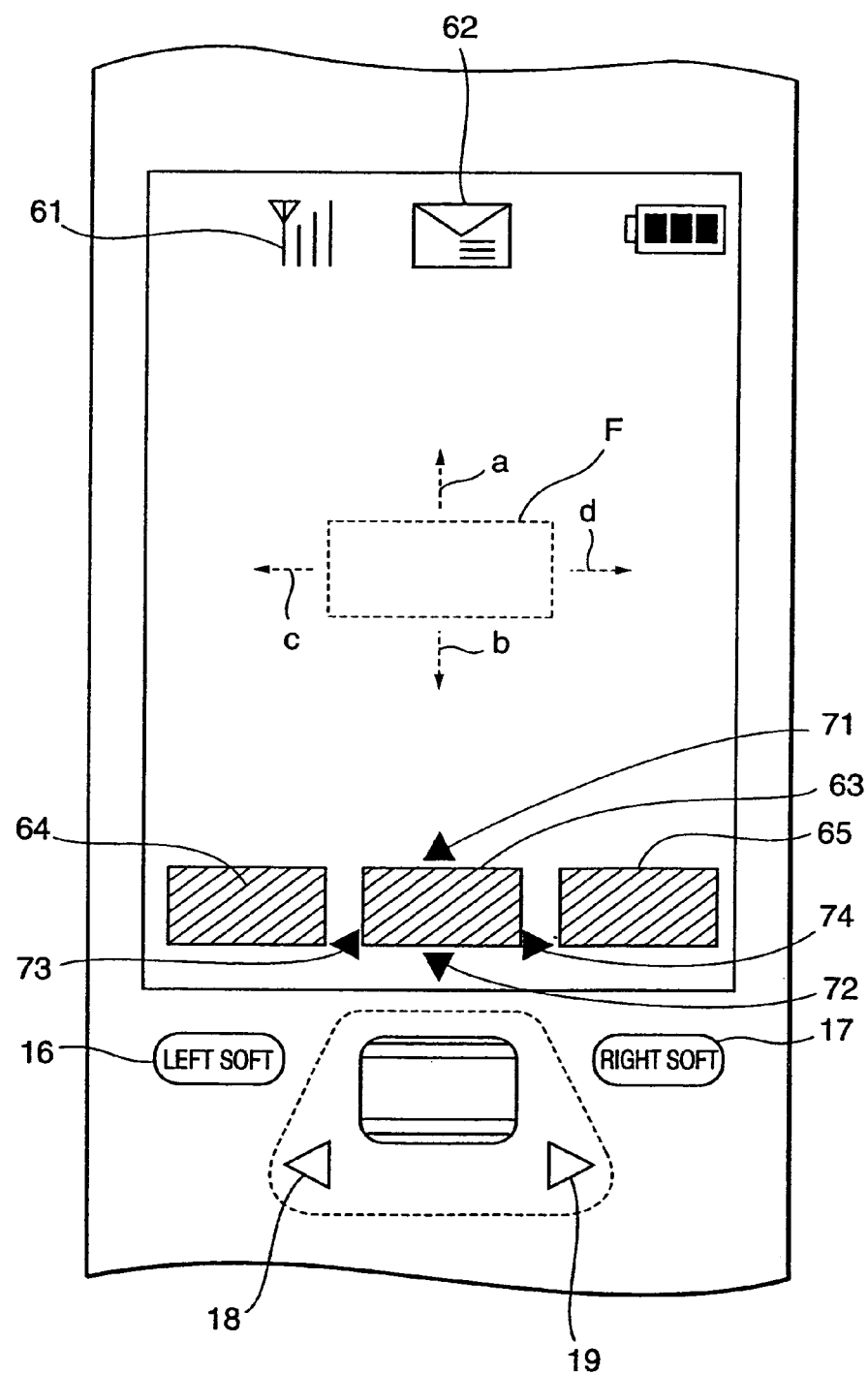
FIG. 10 is a view explaining a configuration of a direction key guidance display.

This direction key guidance display is constituted by an upwardly shiftable mark 71, a downwardly shiftable mark 72, a leftwardly shiftable mark 73 and a rightwardly shiftable mark 74, as shown in FIG. 10. Those direction key guidance displays are displayed as respective arrow marks around a central soft key function indication 63. That is, the upwardly shiftable mark 71 is displayed as an upward arrow mark at an upper position of the central soft key function indication 63. The downwardly shiftable mark 72 is displayed as a downward arrow mark at a lower position of the central soft key function indication 63. The leftwardly shiftable mark 73 is displayed as a left arrow mark at a left position of the central soft key function indication 63. And, the rightwardly shiftable mark 74 is displayed as a rightward arrow mark at a right position of the central soft key function indication 63.

The upwardly shiftable mark 71 is displayed if the rotation push switch 14 can be upwardly operated, and it is not displayed if the rotation push switch 14 cannot be upwardly operated. In other words, the upwardly shiftable mark 71 is displayed, for example, if the focus F can be shifted in a direction of an arrow "a" in FIG. 10 (i.e., for example, if a selectable information exists at a further upper position of the focused information), and it is not displayed if the focus F can not be shifted in the direction of the arrow "a" in FIG. 10 (i.e., for example, if the selectable information does not exist at the further upper position of the focused information.

The downwardly shiftable mark 72 is displayed if the rotation push switch 14 can be downwardly operated, and it is not displayed if the rotation push switch 14 cannot be downwardly operated. In other words, the downwardly shiftable mark 72 is displayed, for example, if the focus F can be shifted in a direction of an arrow "b" in FIG. 10 (i.e., for example, if a selectable information exists at a further lower position of the focused information), and it is not displayed if the focus F cannot be shifted in the direction of the arrow "b" in FIG. 10 (i.e., for example, if the selectable information does not exist at the further lower position of the focused information).

The leftwardly shiftable mark 73 is displayed if the leftward direction key 18 can be operated in the leftward direction, and it is not displayed if the leftward direction key 18 cannot be operated in the leftward direction. The leftwardly shiftable mark 73 is displayed, for example, if the focus F can be shifted in a direction of an arrow "c" in FIG. 10 (i.e., for example, if a selectable information exists at a further leftward position of the focused information or if there is a screen of an upper hierarchy of the selected information), and it is not displayed if the focus F can not be shifted in the direction of the arrow "c" in FIG. 10 (i.e., for example, if the selectable information does not exist at the further leftward position of the focused information or if there is not the screen of the upper hierarchy of the selected information).

The rightwardly shiftable mark 74 is displayed if the rightward direction key 19 can be operated in the rightward direction, and it is not displayed if the rightward direction key 19 cannot be operated in the rightward direction. That is, the rightwardly shiftable mark 74 is displayed, for example, if the focus F can be shifted in a direction of an arrow "d" in FIG. 10 (i.e., for example, if a selectable information exists at a further rightward position of the focused information or if there is a screen of a lower hierarchy of the selected information), and it is not displayed if the focus F can not be shifted in the direction of the arrow "d" in FIG. 10 (i.e., for example, if the selectable information does not exist at the further rightward position of the focused information or if there is not the screen of the lower hierarchy of the selected information).

An actual display example of the direction key guidance display will be described below with reference to the display screen of the portable telephone 1.

FIGS. 11A to 11D are views showing a jump menu that is a short cut screen to each display menu.

Figure 11A:
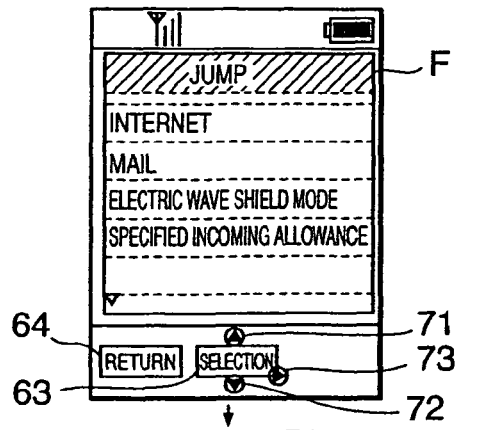
FIGS. 11A to 11D are views showing a jump menu screen.

FIG. 11A is a display screen of a state at which when a jump menu screen is displayed, the focus F points out a character string of "Jump" of its menu title. The upwardly shiftable mark 71, the downwardly shiftable mark 72 and the leftwardly shiftable mark 73 are displayed at the state of this display screen. At this time, it is possible to shift the focus F upwardly and downwardly using the rotation push switch 14. Moreover, at this time, it is also possible to display the lower hierarchy on the screen by pushing the rightward direction key 19.

Figure 11B:
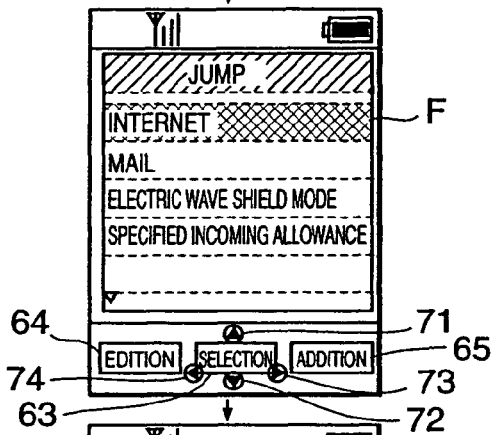

Pushing the rightward direction key 19 on the display screen of FIG. 11A results in a display screen of: FIG. 11B. This display screen of FIG. 11B is a selection screen showing an individual menu within the jump menu, and it is a screen of a state at which the focus F points out a selection position of "Internet". The upwardly shiftable mark 71, the downwardly shiftable mark 72, the leftwardly shiftable mark 73 and the rightwardly shiftable mark 74 are displayed on this display screen. At this time, it is possible to shift the focus F upwardly and downwardly by rotating the rotation push switch 14. Moreover, at this time, it is also possible to display the upper hierarchy (the screen of FIG. 11A) on the screen by pushing the leftward direction key 18, and to display the lower hierarchy on the screen by pushing the rightward direction key 19.

Figure 11C:
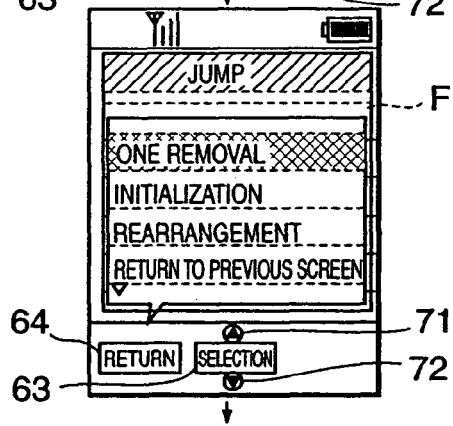

Pushing the left soft key 16 on the display screen of FIG. 11B results in a display screen of FIG. 11C. This display screen of FIG. 11C is an edition screen showing an individual menu within the jump menu. The upwardly shiftable mark 71 and the downwardly shiftable mark 72 are displayed on this display screen. At this time, it is possible to shift the focus F upwardly and downwardly by rotating the rotation push switch 14.

Figure 11D:
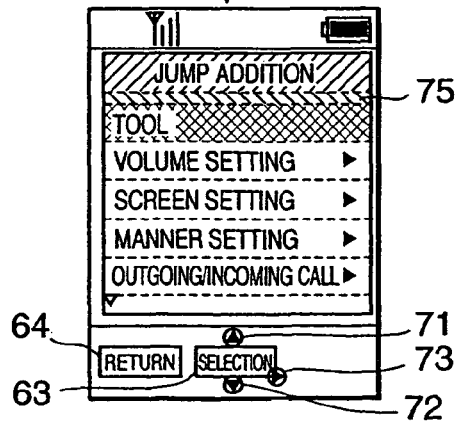

Pushing the right soft key 17 on the display screen of FIG. 11B results in a display screen of FIG. 11D. This display screen of FIG. 11D is an addition screen of an individual menu display within the jump menu. The upwardly shiftable mark 71, the downwardly shiftable mark 72 and the leftwardly shiftable mark 73 are displayed on this display screen. At this time, it is possible to shift the focus F upwardly and downwardly by rotating the rotation push switch 14. Moreover, at this time, it is also possible to display the lower hierarchy on the screen by pushing the rightward direction key 19.

Here, a division line 75 indicative of a head of a list is displayed on this display screen of FIG. 11D. The division line 75 indicative of the head of this list is used in the following. manner, for example. That is, there is a case that although the number of displayed lists is definite, the focus is desired to be cyclically shifted by the rotating operation of the rotation push switch 14, namely, there is a case that the focus is desired to be shifted in order to make the focus coincide with the lowest portion of the list by instructing the further upward direction even if the focus coincides with the uppermost portion of the list. If the cyclic focus shift is carried out as mentioned above, a portion at which the head of the list is located cannot be evidently provided to the user.

Accordingly, this portable telephone 1 is designed such that the division line 75 is displayed at the uppermost division position of the list.

Figure 12A:
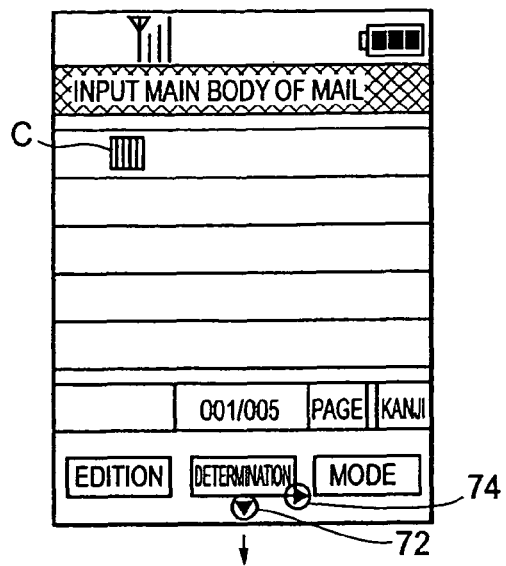
FIGS. 12A to 12C are views explaining a direction key guidance display by indicating a mail input screen.
Figure 12B:
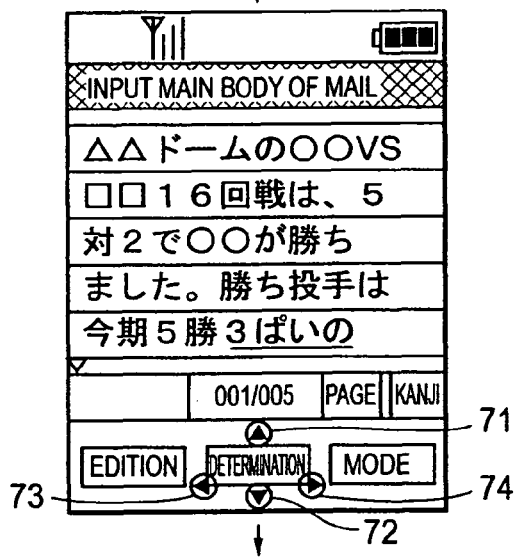
Figure 12C:
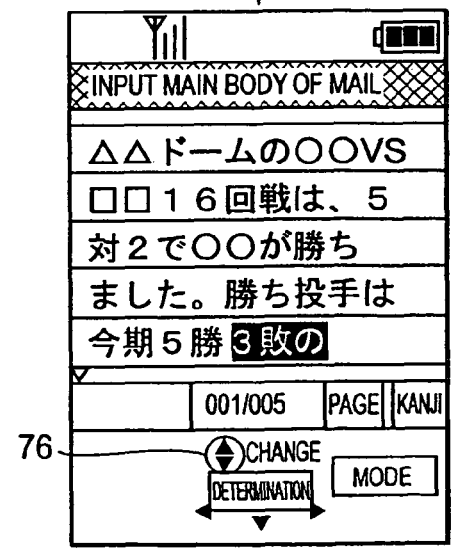

FIGS. 12A to 12C are views showing an input screen of an electronic mail.

FIG. 12A is a display screen when even one character is not still written to a main body of a mail, and a cursor C is located on a left upper portion. The downwardly shiftable mark 72 and the rightwardly shiftable mark 74 are displayed on this display screen. At this time, it is possible to shift the cursor C downwardly by rotating the rotation push switch 14 downwardly. Moreover, at this time, it is also possible to shift the cursor C in the rightward direction by pushing the rightward direction key 19.

FIG. 12B is a display screen under a condition that the main body of the mail is written to a certain degree. The characters on the display shown in FIG. 12B and FIG. 12C are in Japanese in order to explain the character conversion function of the portable telephone of the present embodiment. The sentences shown in these figures means "○○ won 16-the game between ○○ and □□ in △△ dome with score of 5-2. Winning pitcher was ×× (not shown) who has won five games and lost three games in this season." The last word in the fifth row, which is shown with an underline, has just been currently inputted to be converted into a word with kanji. The upwardly shiftable mark 71, downwardly shiftable mark 72, the leftwardly shiftable mark 73 and the rightwardly shiftable mark 74 are displayed on this display screen. After the conversion, the cursor C will appear after the converted word. At this time, it is possible to shift the cursor C upwardly and downwardly by rotating the rotation push switch. Moreover, at this time, it is also possible to shift the cursor C in the leftward direction by pushing the leftward direction key 18, and to shift the cursor C in the rightward direction by pushing the rightward direction key 19.

FIG. 12C is a display screen when the word underlined in FIG. 12B has been converted into one of word with kanji (Chinese character). On this display screen, a conversion candidate display 76 is displayed for indicating that a conversion candidate is outputted by rotationally operating the rotation push switch 14.

In this portable telephone 1, a page feed guidance display is also carried out for indicating whether or not a previous page feed can be done by using the upward page feed key 25 or whether or not a next page feed can be done by using the downward page feed key 26.

That is, the page feed guidance display is the information to indicate whether or not the operation of the upward page feed key 25 or the downward page feed key 26 enables a page to be fed, namely, whether or not there is further information, currently invisible, beyond the display screen.

Figure 13:
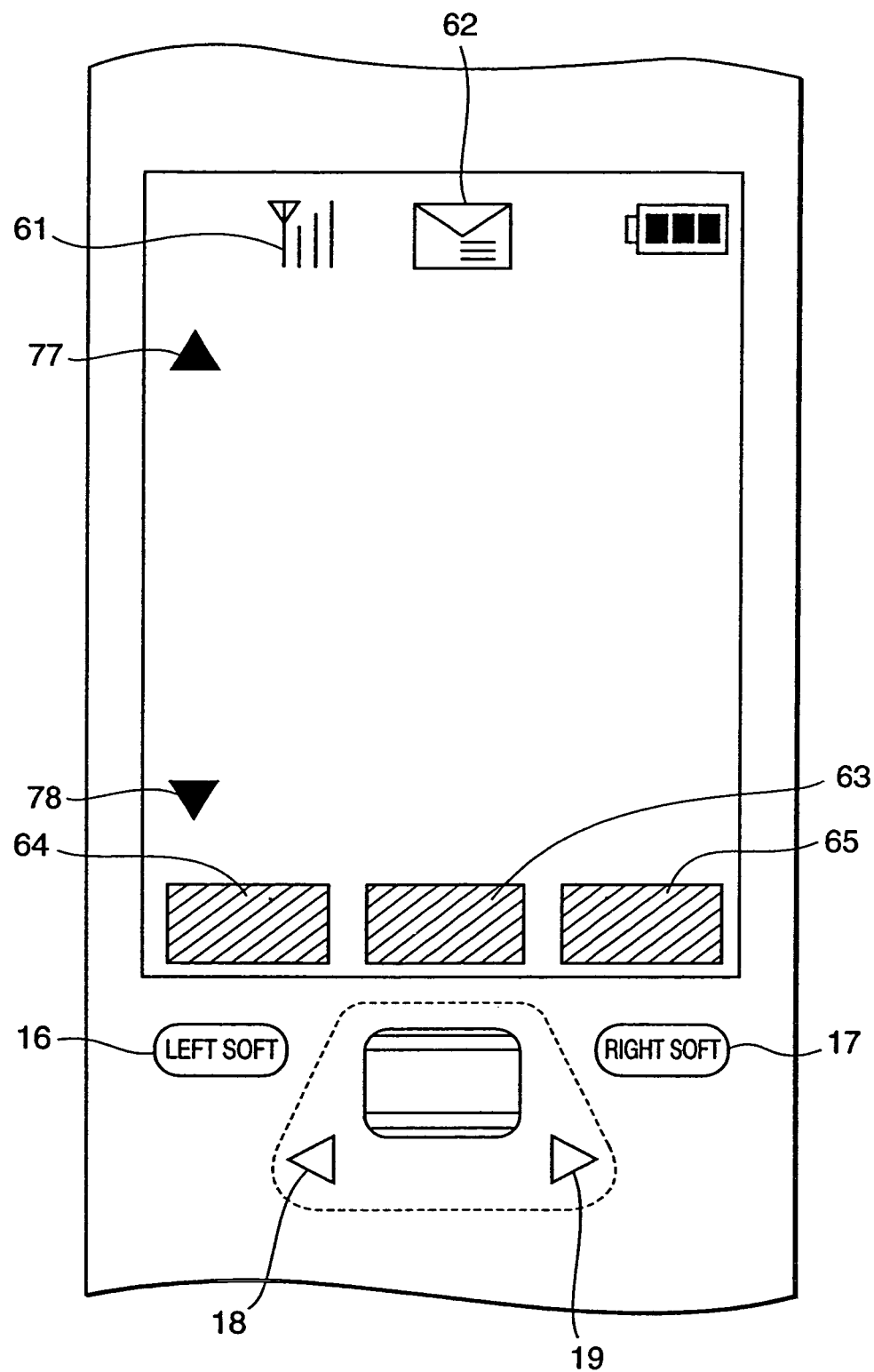
FIG. 13 is a view explaining a configuration of a page feeding guidance display.

This page feed guidance display is constituted by an upwardly feedable page mark 77 and a downwardly feedable page mark 78, as shown in FIG. 13. Those page feed guidance displays are displayed at upper and lower positions on the left side of the display screen, respectively.

The upwardly feedable page mark 77 is displayed if the page feed can be upwardly done by using the upward page feed key 25, and it is not displayed if the operation is impossible.

The downwardly feedable page mark 78 is displayed if the page feed can be downwardly done by using the downward page feed key 26, and it is not displayed if the operation is impossible.

An actual display example of the page feed guidance display will be described below with reference to the display screen of the portable telephone 1.

Figure 14A:
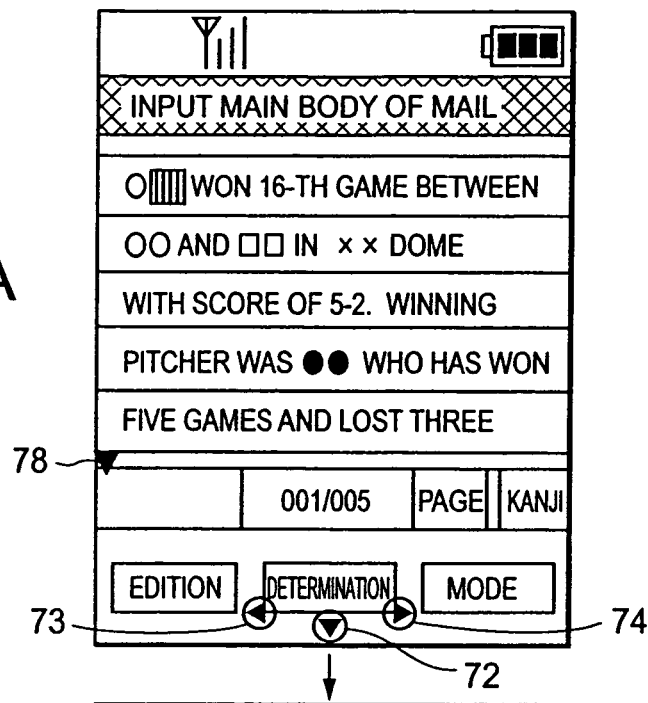
FIGS. 14A to 14B are views explaining a page feeding guidance display by indicating a mail input screen.
Figure 14B:
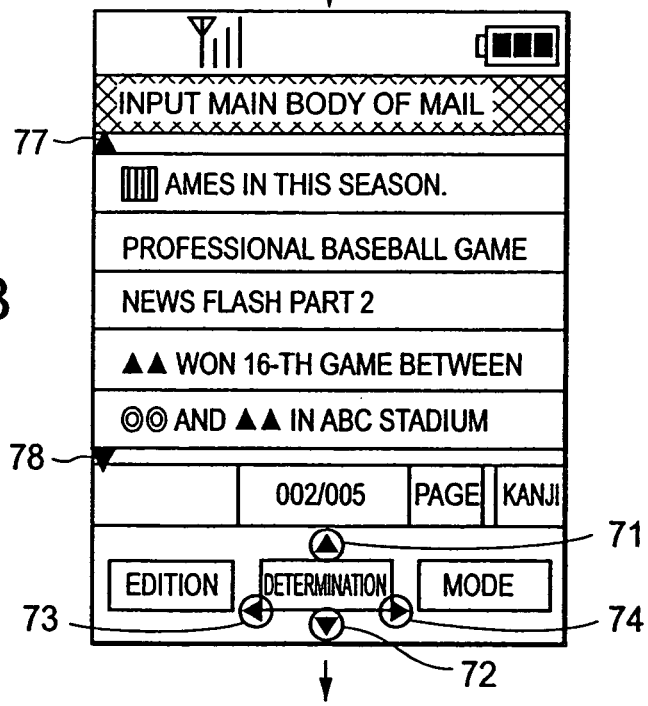

FIGS. 14A to 14B are views showing an input screen of an electronic mail.

FIG. 14A is a display screen when the cursor is located at the position of the second character on the first row, under a condition that the main body of the mail is written to a certain degree. The downwardly feedable page mark 78 is displayed on this display screen. At this time, it is possible to scroll the page downwardly by pushing the downward page feed key 26.

FIG. 14B is a display screen when the page is downwardly scrolled correspondingly to one page from the state of FIG. 14A. The upwardly feedable page mark 77 and the downwardly feedable page mark 78 are displayed on this display screen. At this time, it is possible to scroll the page upwardly by pushing the upward page feed key 25. Also, it is possible to scroll the page downwardly by pushing the downward page feed key 26.

In the portable telephone 1, such executions of the direction key guidance display and the page feed key guidance display can improve the operational performances of the direction keys and the page feed keys and accordingly improve the convenience of the user.

(Answer Rejection During Music Reproduction)

The process of the portable telephone 1 when there is an incoming call from a partner during an audio reproduction will be described below with reference to display screens of FIGS. 15A, 15B and a flowchart of FIG. 16.

Figure 15A:
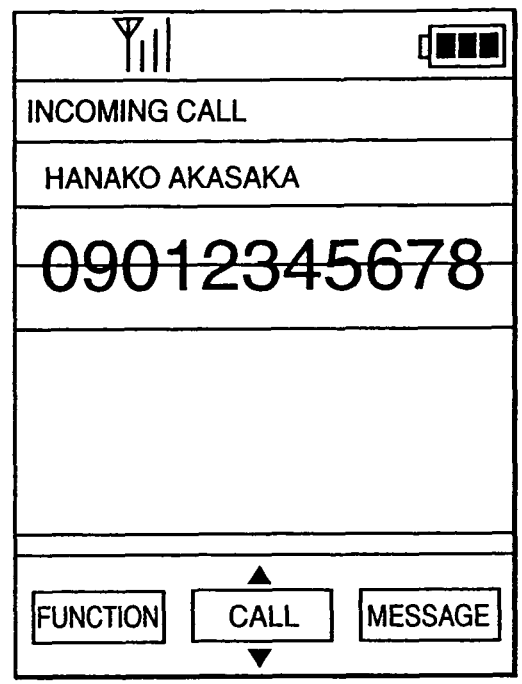
FIGS. 15A and 15B are views showing a display screen when there is an incoming call during music reproduction.
Figure 15B:
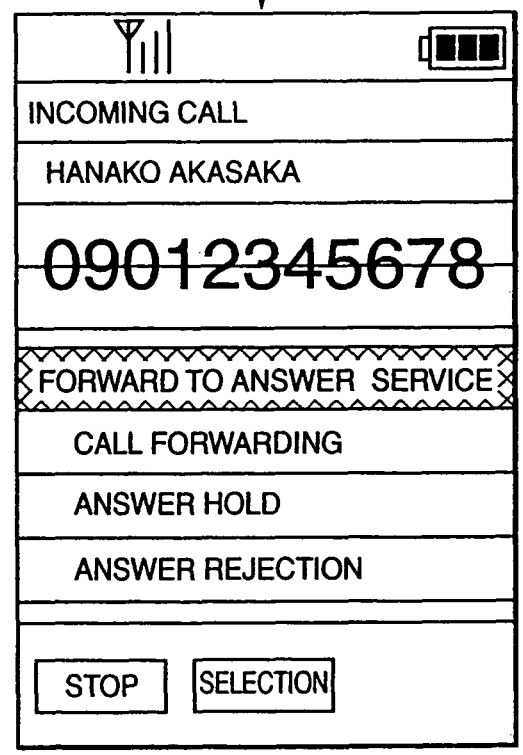

When the portable telephone 1 receives an incoming call from a partner during an audio reproduction (Step S21), a display screen is displayed as shown in FIG. 15A. At this time, if any key except the left soft key 16 is pushed (Step S22), the incoming call is received to start a call. Here, if the call is started, the audio reproduction is transiently suspended (Step S23). Also, when there is the incoming call, and the left soft key 16 is pushed (Step S22), a menu is displayed as shown in FIG. 15B (Step S24).

At this step S24, a menu display is carried out for indicating "Forward to Answer Service", "Incoming Call Forwarding", "Answer Holding" and "Answer Rejection".

In succession, in accordance with this menu display, the rotation push switch 14 is rotationally operated to then select any one of the menus (Steps S25, S26).

Here, if "Forward to Answer Service" is selected, a process is carried out for forwarding the telephone call from the partner to a telephone answer service station installed in the base station. If "Incoming Call Forwarding" is selected, a process is carried out for forwarding the telephone call from the partner to another telephone number. Also, if "Answer Holding" is selected, a state at which the incoming call from the partner is held is maintained (namely, the calling state is held). And, if "Answer Rejection" is selected, a process is carried out for disconnecting the telephone call from the partner.

In the portable telephone 1, if such a menu selection is done, an operation for rejecting a call is carried out correspondingly to the selection. At this time, the audio reproduction is continued (Step S27).

As mentioned above, in the portable telephone 1, if there is the incoming call during the audio reproduction, the rejection of the call is done depending on the operational input. Due to this mechanism, in the portable telephone 1, the simple operation enables the reproduction to be continued if there is the incoming call during the audio reproduction.

(Emergent Telephone Call in Case of Outgoing/Incoming Call off Mode)

In this portable telephone 1, an outgoing/incoming call off mode can be set so as not to transmit and receive an electric wave by stopping the operation of the transmission/reception unit 51. When this outgoing/incoming call off mode is selected, for example, on the menu screen, the system controlling unit 57 stops a protocol operation of the transmission/reception unit 51, and perfectly stops transmitting and receiving the electric wave to and from the base station. Such setting of the outgoing/incoming call off mode can stop only the transmission and reception of the electric wave without turning off the power supply of the main body. Thus, it can be set at the state that the functions except the telephone function can be used. Hence, for example, although the telephone function cannot be used at this outgoing/incoming call off mode, it is possible to carry out the input operation of the character of the electronic mail, the recording and the reproduction of the music, and the like other operations.

Here, a process when a telephone number input is carried out in a case of this outgoing/incoming call off mode is set being described with reference to FIG. 17.

If the outgoing/incoming call off mode is set, when the dial key 24 is pushed and a telephone number is inputted (Step S31), the system controlling unit 57 displays the pushed telephone number on the display 15 (Step S32).

In succession, when the start key 33 is pushed (Step S33), the system controlling unit 57 judges whether or not its telephone number inputted is one of emergency phone call numbers (for example, in a case of Japan, 110 for police, 118 for coast guard and 119 for fire station and/or ambulance) or a pre-registered predetermined telephone number (Step S34). By the way, the registered telephone number is desired to be different from a usual address registration, and it is desired to be a telephone number specially registered for an emergency.

If the telephone number inputted is not one of the emergency phone call numbers or the pre-registered telephone number, the outgoing call is stopped, and the outgoing/incoming call off mode is maintained in its original state (Step S35). That is, a phone call cannot be made.

On the other hand, if it is one of the emergency phone call numbers or the pre-registered telephone number, the system controlling unit 57 cancels the outgoing/incoming call off mode, and then actuates the protocol process of the operation of the transmission reception unit 51 (Step S36).

In succession, when the protocol process of the operation of the transmission/reception unit 51 is started, the transmission/reception unit 51 starts an operation for capturing a base station.

When the transmission/reception unit 51 captures the base station, the transmission/reception unit 51 starts a process for transmitting an input telephone number (Step S38).

As mentioned above, in this portable telephone 1, even if it is set at the outgoing/incoming call off mode at which the transmission/reception of the electric wave is stopped and the outgoing/incoming of a call is not done, if a phone call of emergency or a preliminarily registered phone call is made, a call can be started without canceling operation of the outgoing/incoming call off mode by the user. Thus, it is possible to immediately make a report or make a call.

(Automatic Outgoing/Incoming Call Off During Recording Audio Data)

Figure 18:
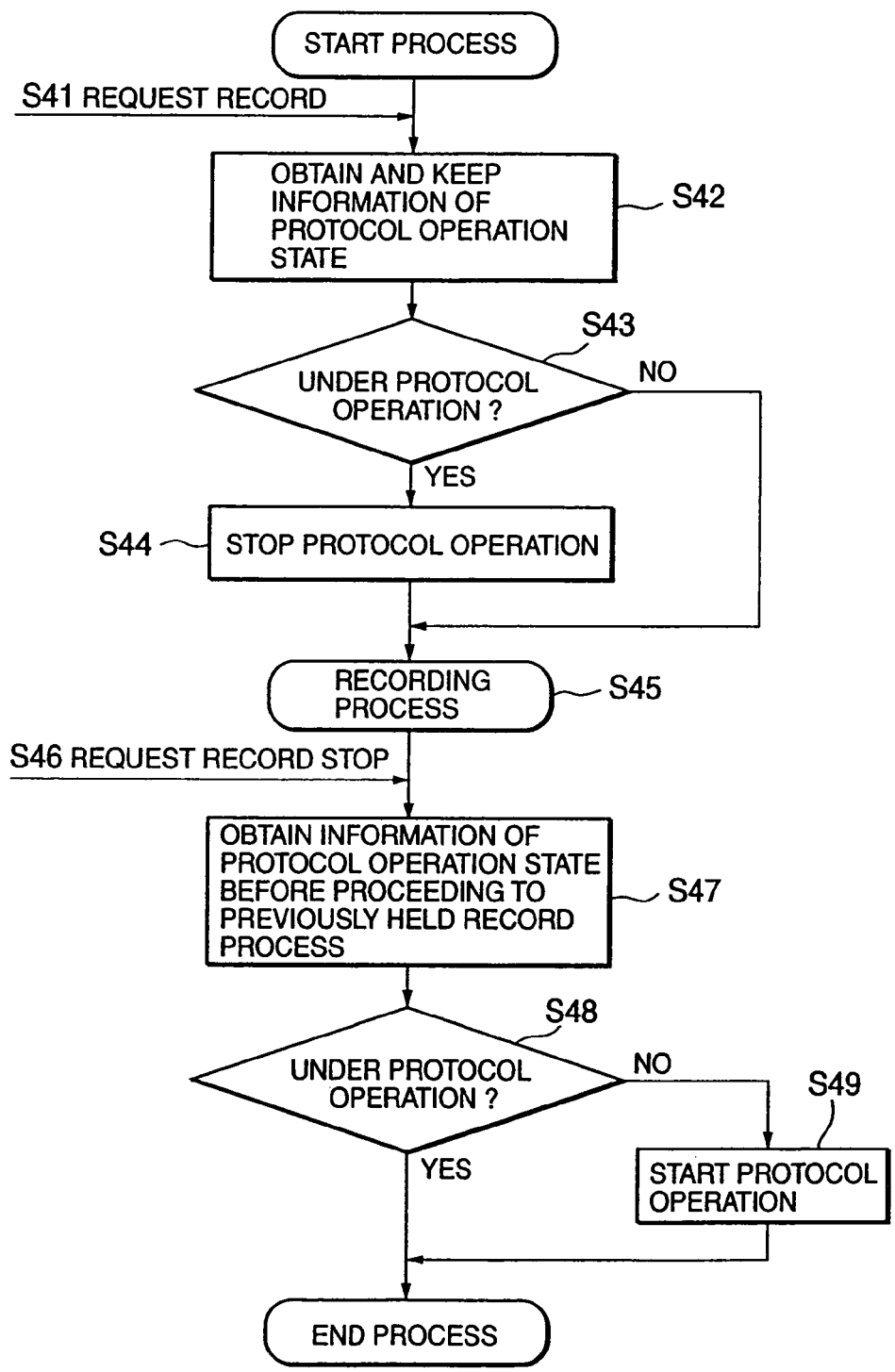
FIG. 18 is a flowchart showing a processing procedure when there is a recording request of an audio data.

As mentioned above, in the portable telephone 1, the audio data inputted from the line input terminal 34 or the data input/output terminal 33 can be recorded on the memory card 4. A process when there is a request for recording audio data in the portable telephone 1 is described with reference to FIG. 18.

At first, when the power supply of the portable telephone 1 is turned on and there is the request for recording the audio data (Step S41), the system controlling unit 57 obtains information of a protocol operation state of the transmission/reception unit 51, and stores it in a memory (Step S42).

The system controlling unit 57 judges whether or not the protocol for the transmission/reception of the transmission/reception circuit 51 is currently operated (Step S43). If the protocol is operated, the operational flow proceeds to step S44. If it is not operated, the operational flow proceeds to step S45.

The system controlling unit 57, if the protocol of the transmission/reception circuit 51 is operated, stops the operation of the protocol of this transmission reception circuit 51, and sets at the portable phone 1 at the outgoing/incoming call off mode in which the outgoing/incoming of the telephone call is not carried out.

The system controlling unit 57 starts the operation for recording the audio data (Step S45). Thus, the operation for recording the audio data at this step S45 is always carried out at the state at which it is set at the outgoing/incoming call off mode.

The system controlling unit 57, if there is a record stop request (Step S46), obtains a protocol operation state of the transmission/reception circuit 51 prior to the actuation of the recording operation stored in the memory at the previous step S42 (Step S47).

It judges whether or not the protocol is under operation, from the information read out at the step S47 (Step S48). If the protocol is under operation, the operational flow proceeds to step S49. If it is not under operation, the process is ended.

Next, the system controlling unit 57, if the protocol of the transmission/reception circuit 51 is under operation, starts the operation of the protocol of the transmission/reception circuit 51 (Step S49). Then, the series of audio recording processes is ended.

As mentioned above, in the portable telephone 1, the interference in the recording operation caused by the incoming call can be avoided by automatically setting it at the outgoing/incoming call off mode, if there is the recording operation request.

(Display of Electric Field Strength in Remote Controller)

In the portable telephone 1, the remote controller unit 3 is mounted as mentioned above. The remote controller 42 in this remote controller unit 3 carries out a remote control for reproducing the audio data recorded on the memory card 4 and a remote control for the function of the main body of the portable telephone.

Figure 19:
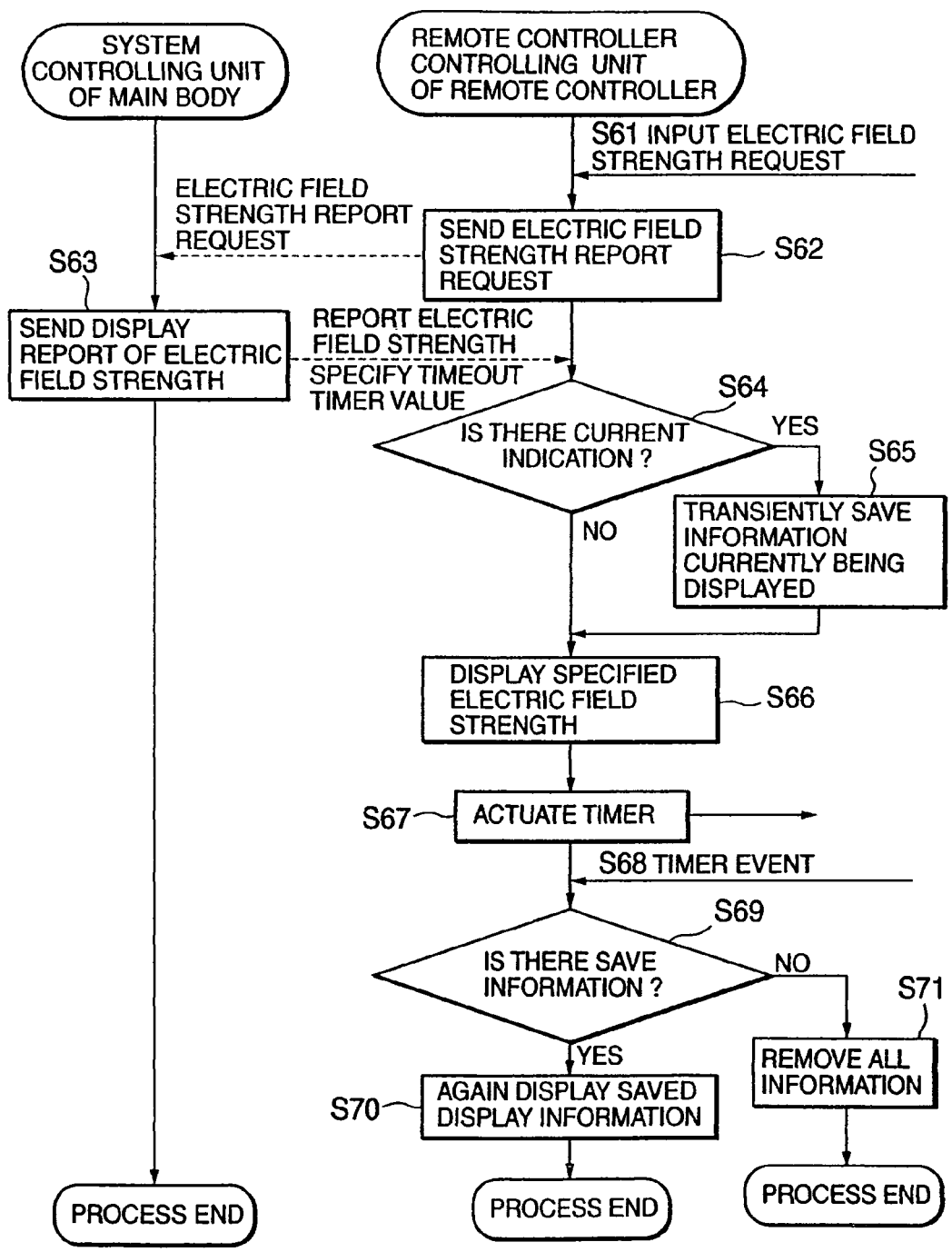
FIG. 19 is a flowchart showing a processing procedure when an electric field strength display is performed on a remote controller.
Figure 20:
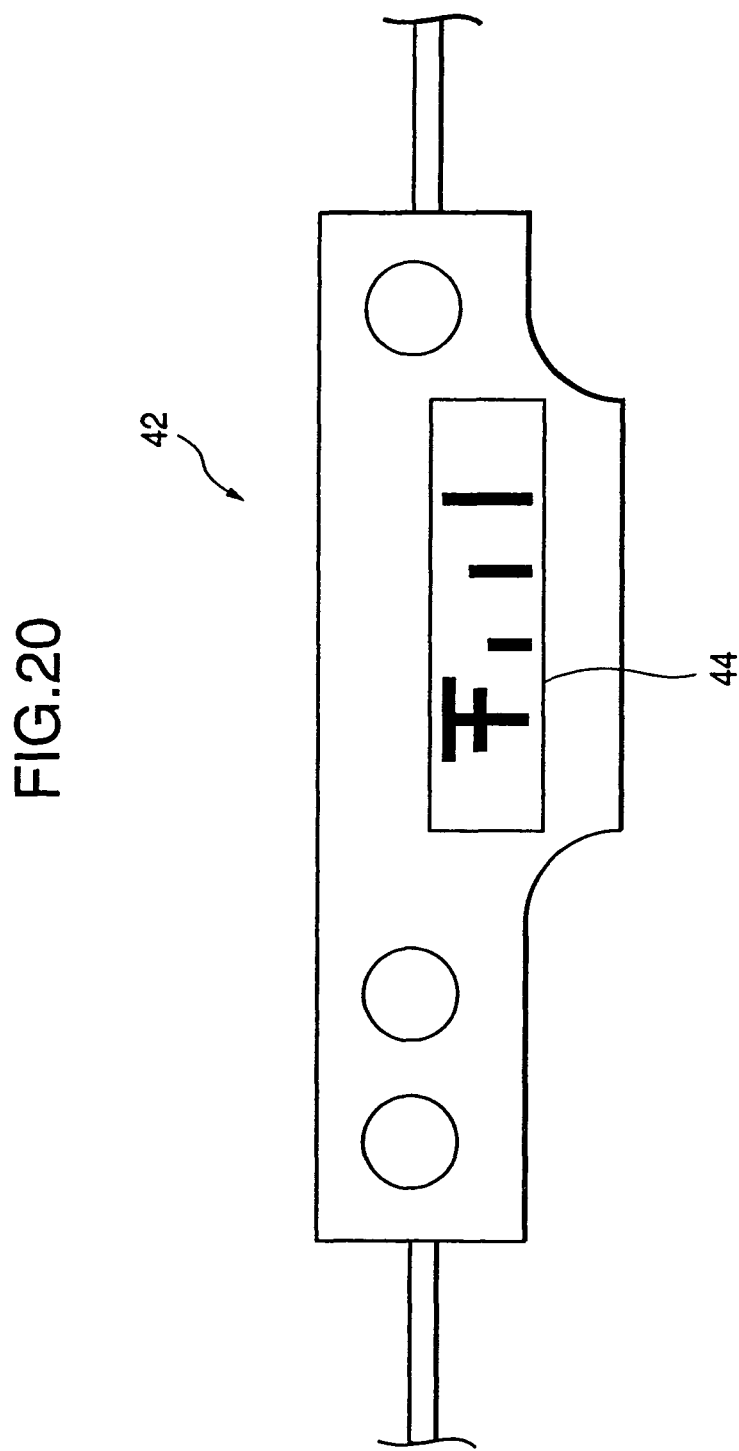
FIG. 20 is a flowchart showing charge strength information to be displayed on a display of a remote controller.

Such process for displaying electric field strength through the remote controller 42 will be described below with reference to a flowchart shown in FIG. 19.

If the user requests a display of electric field strength (Step S61), the remote controller controlling unit 46 of the remote controller 42 sends a report request of the electric field strength to the system controlling unit 57 (Step S62).

The system controlling unit 57 of the main body 2 sends electric field strength information currently being held (the information for displaying the electric field strength indication 61) and a timeout timer value to the remote controller 42 (Step S63).

When receiving the report from the system controller 57, the remote controller controlling unit 46 of the remote controller 42 judges whether or not any indication is currently displayed on the display unit 44 of the remote controller 42 (Step S64). If any indication is displayed on the display unit 44, the operational flow proceeds to step S65. If it is not displayed, the operational flow proceeds to step S66.

The remote controller controlling unit 46 of the remote controller 42 transiently saves the information currently being displayed on the display unit 44 (Step S65).

The remote controller controlling unit 46 of the remote controller 42 displays the electric field strength on the display unit 44, based on the electric field strength information sent out from the system controlling unit 57 of the main body 2 (Step S66). In the embodiment, the electric field strength information is displayed on the display unit 44 at approximately four stage levels, for example, such as an excellent level, a usual level, a bad level and an impossible communication. However, the indication is not limited to such four-stage-level display, and any other way for indicating the electric field strength may be employed.

The remote controller controlling unit 46 of the remote controller 42 actuates a timer (Step S67). The actuated timer carries out counting until a counted value reaches the timeout timer value sent out from the system controlling unit 57 of the main body 2. If the counting is ended, a timer event is generated.

If the timer event is generated from the timer (Step S68), The remote controller controlling unit 46 of the remote controller 42 judges whether or not there is the save information transiently saved at the step S65 (Step S69). If there is the save information, the operational flow proceeds to step S70. If there is not the save information, the operational flow proceeds to step S71.

In succession, if there is the save information, the remote controller controlling unit 46 of the remote controller 42 again displays the save information, and ends the process (Step S70). Also, the remote controller controlling unit 46 of the remote controller 42, if there is not the save information, removes the indication on the display unit 44, and ends the process (Step S71).

By the way, it may be designed that the timeout timer value is not sent out from the main body 2 and that it is set in advance on the remote controller side.

As mentioned above, the portable telephone 1 has the remote controller unit 3 separately mounted from the main body 2, and the electric field strength information is displayed on this remote controller unit 3. This mechanism of the portable telephone 1 enables the electric field strength of the received electric wave to be simply and conveniently checked by the user. For example, even if the main body 2 of the portable telephone is kept in a bag or the like, the electric field strength information is displayed on, for example, the remote controller unit 3. Thus, the user can check a current electric wave reception state very simply without especially taking out the main body 2 from the bag or the like to check the status. Also, the electric field strength information is not always displayed on the remote controller unit 3. That is, it is displayed, as necessary, in accordance with the operation from the user. Hence, it is possible to effectively use the display region placed on the remote controller unit 3.

(Display of Incoming Call on Remote Controller)

In the portable telephone 1, the remote controller unit 3 is disposed as mentioned above. The remote controller 42 of this remote controller unit 3 carries out the remote control for reproducing the audio data recorded on the memory card 4 and the remote control to the function of the main body 2 of the portable telephone.

Figure 21:
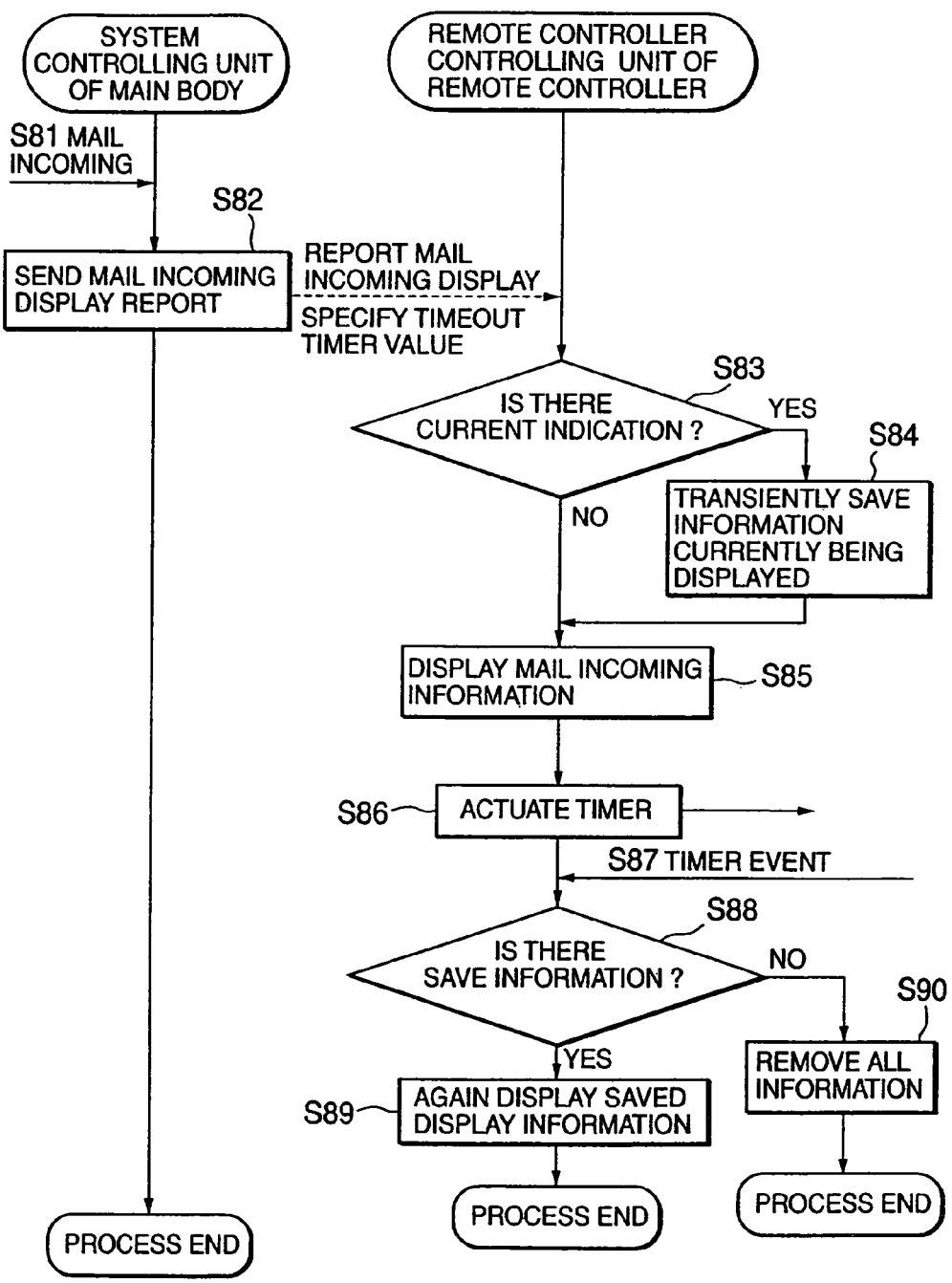
FIG. 21 is a flowchart showing a processing procedure when an incoming mail indicating display is performed on a remote controller.

A process for displaying a mail incoming by using such a remote controller 42 will be described below with reference to a flowchart shown in FIG. 21.

When automatically receiving a mail data from the base station (Step S81), the system controlling unit 57 of the main body 2 sends out a mail incoming display report and a timeout timer value to the remote controller 42 (Step S82).

When receiving the report from the system controller 57, the remote controller controlling unit 46 of the remote controller 42 judges whether or not any-indication is currently displayed on the display unit 44 of the remote controller 42 (Step S83). If any indication is displayed on the display unit 44, the operational flow proceeds to step S84. If it is not displayed, the operational flow proceeds to step S85.

The remote controller controlling-unit 46 of the remote controller 42 transiently saves the information currently being displayed on the display unit 44 (Step S84).

Figure 22:
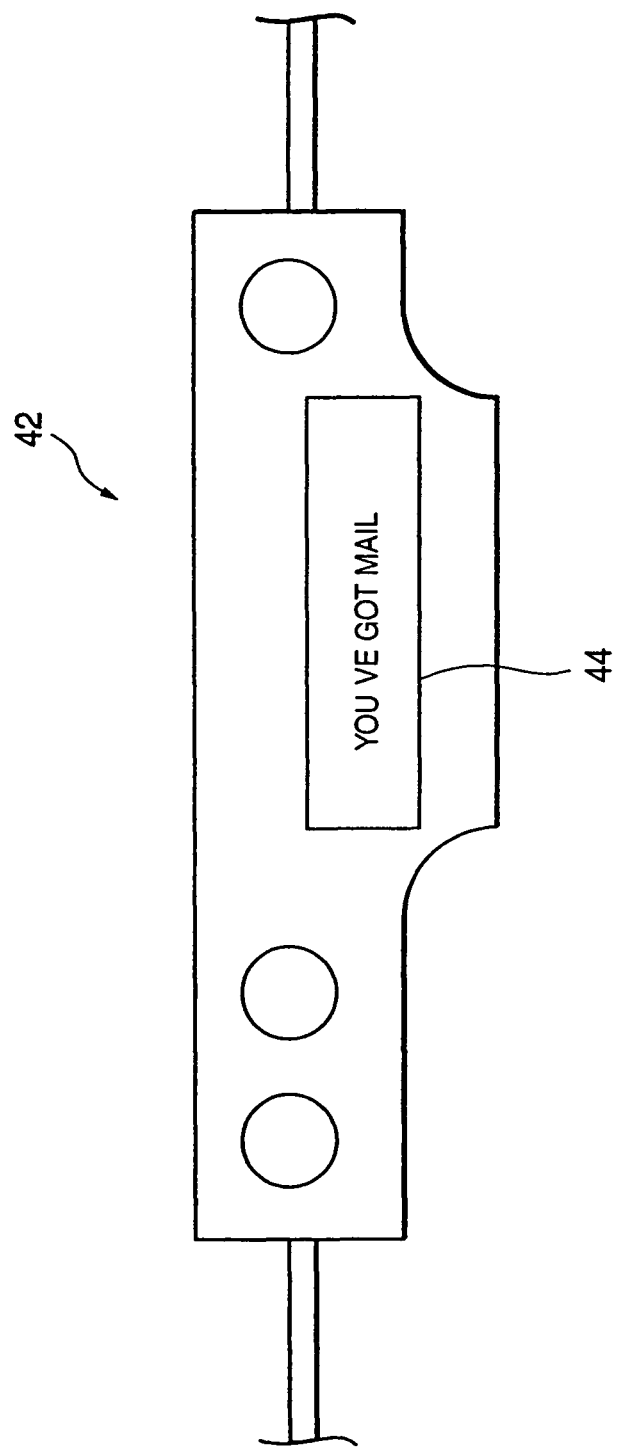
FIG. 22 is a view showing incoming mail information to be displayed on a display of a remote controller.

In accordance with a mail incoming report sent out from the system controlling unit 57 of the main body 2, the remote controller controlling unit 46 of the remote controller 42 displays the mail incoming indicative of the presence of the mail incoming (Step S85). This incoming indication is displayed, for example, such as "You've Got Mails", as shown in FIG. 22.

The remote controller controlling unit 46 of the remote controller 42 actuates the timer (Step S86). Then, the actuated timer carries out counting until a counted value reaches the timeout timer value sent out from the system controlling unit 57 of the main body 2. When the count is ended, the timer event is generated.

When the timer event is generated from the timer (Step S87), the remote controller controlling unit 46 of the remote controller 42 judges whether or not there is the save information transiently saved at the step S84 (Step S88). If there is the save information, the operational flow proceeds to step S89. If there is not the save information, the operational flow proceeds to step S90.

In succession, when there is the save information, again displays the save information, the remote controller controlling unit 46 of the remote controller 42, and ends the process (Step S89). Also, the remote controller controlling unit 46 of the remote controller 42, when there is not the save information, removes the indication on the display unit 44, and ends the process (Step S90).

By the way, it may be designed that the timeout timer value is not sent out from the main body 2 and that it is set in advance on the remote controller side.

As mentioned above, the portable telephone 1 has the remote controller unit 3 separately mounted from the main body 2, and the fact of the incoming of the electronic mail is displayed on this remote controller unit 3.

This mechanism of the portable telephone 1 which is a characteristic feature of the invention enables the fact of the incoming of the electronic mail to be quickly reported to the user. Also, the user can easily recognize the fact of the incoming of the electronic mail. In the portable telephone 1, for example, even if the main body 2 is kept in a bag or the like, the mail incoming is displayed on, for example, the display of the remote controller unit 3. Thus, the user can recognize the fact of the incoming of the electronic mail quickly and easily without especially checking the main body 2.

What is claimed is:

1. A portable communication apparatus comprising:
   a communication unit configured to receive an incoming call;
   a display unit and
   a controller unit configured to:
      reproduce music data via the portable communication apparatus,
      display, via the display unit, a music data screen for the music data being reproduced, wherein the music data screen comprises an option for controlling the reproduction of the music data,
      receive an indication that the incoming call is received at the portable communication apparatus,
      display, via the display unit, an incoming call screen based on the indication that the incoming call is received, wherein the incoming call screen comprises at least one of an indication of a caller or a phone number associated with the incoming call, and wherein the incoming call screen comprises an indication to start the incoming call and an indication of a menu display of operations to reject the incoming call,
      while the incoming call is being received at the portable communication apparatus, determine that the indication to start the incoming call has been selected or that the indication of the menu display of operations to reject the incoming call has been selected,
      upon the determination that the indication to start the incoming call has been selected, start the incoming call and suspend the reproduction of the music data,
      end the incoming call after the incoming call is started,
      upon the determination that the indication of the menu display of operations to reject the incoming call has been selected, display, via the display unit, the menu display of operations that includes a menu operation for rejecting the incoming call at the portable communication apparatus,
      while the incoming call is being received at the portable communication apparatus, receive an indication that the menu operation for rejecting the incoming call has been selected, and
      determine to continue the reproduction of the music data based on the indication that the menu operation for rejecting the incoming call has been selected.

2. The portable communication apparatus according to claim 1, wherein the menu operation for rejecting the incoming call is for forwarding the incoming call, holding the incoming call, or rejecting the incoming call.

3. The portable communication apparatus according to claim 1, wherein the music data screen comprises at least one of a title or an artist associated with the music data.

4. The portable communication apparatus according to claim 1, wherein the controller unit is configured to detect the incoming call while the music data is being reproduced.

5. The portable communication apparatus according to claim 1, wherein the option for controlling the reproduction of the music data comprises at least one of a play operation or a pause operation.

6. A method of operating a portable communication device, the method comprising:
   reproducing music data via the portable communication device;
   displaying, via a display unit of the portable communication device, a music data screen for the music data being reproduced, wherein the music data screen comprises an option for controlling the reproduction of the music data;
   receiving, at the portable communication device, an incoming call;
   displaying, via the display unit, an incoming call screen based on the receipt of the incoming call, wherein the incoming call screen comprises at least one of an indication of a caller or a phone number associated with the incoming call, and wherein the incoming call screen comprises an indication to start the incoming call and an indication of a menu display of operations to reject the incoming call;

while the incoming call is being received at the portable communication device, determining that the indication to start the incoming call has been selected or that the indication of the menu display of operations to reject the incoming call has been selected, upon determining that the indication of the menu display of operations to reject the incoming call has been selected, displaying, via the display unit, the menu display of operations that includes a menu operation for rejecting the incoming call at the portable communication device;

while the incoming call is being received at the portable communication device, receiving an indication that the menu operation for rejecting the incoming call has been selected; and determining to continue the reproduction of the music data based on the indication that the menu operation for rejecting the incoming call has been selected.

7. The method according to claim 6, wherein the menu operation for rejecting the incoming call is for forwarding the incoming call, holding the incoming call, or rejecting the incoming call.

8. The method according to claim 6, wherein the music data screen comprises at least one of a title or an artist associated with the music data.

9. The method according to claim 6, wherein the incoming call is detected while the music data is being reproduced.

10. The method according to claim 6, wherein the option for controlling the reproduction of the music data comprises at least one of a play operation or a pause operation.

11. The method according to claim 6, the method further comprising:

upon determining that the indication to start the incoming call has been selected, starting the incoming call and suspending the reproduction of the music data; and upon receipt of an indication to end the incoming call after the incoming call is started, ending the incoming call.

* * * * *